(12) United States Patent
Inoue et al.

(10) Patent No.: US 7,138,201 B2
(45) Date of Patent: Nov. 21, 2006

(54) LIQUID THERMOSETTING SEALING AGENT FOR POLYMER ELECTRODE MEMBRANE FUEL CELL, SINGLE CELL FORMED WITH SEALING AGENT, ITS PROCESS, AND PROCESS FOR REGENERATING POLYMER ELECTRODE MEMBRANE FUEL CELL

(75) Inventors: Masajirou Inoue, Saitama (JP);
Teruyuki Ohtani, Saitama (JP);
Hiroyuki Tanaka, Saitama (JP);
Nobuaki Kimura, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 217 days.

(21) Appl. No.: 09/986,311

(22) Filed: Nov. 8, 2001

(65) Prior Publication Data

US 2002/0081480 A1 Jun. 27, 2002

Related U.S. Application Data

(63) Continuation of application No. 09/877,233, filed on Jun. 11, 2001, now abandoned.

(30) Foreign Application Priority Data

Jun. 12, 2000 (JP) .............................. 2000-175054

(51) Int. Cl.
*H01M 2/08* (2006.01)

(52) U.S. Cl. .......................... 429/35; 429/36; 29/623.2

(58) Field of Classification Search .................. 429/35, 429/36; 29/623.2
See application file for complete search history.

(56) References Cited

U.S. PATENT DOCUMENTS

| | | | | |
|---|---|---|---|---|
| 5,110,691 A | * | 5/1992 | Krasij et al. .................... | 429/35 |
| 5,464,700 A | * | 11/1995 | Steck et al. ..................... | 429/30 |
| 5,523,175 A | * | 6/1996 | Beal et al. ....................... | 429/30 |
| 6,153,326 A | * | 11/2000 | Matsukawa et al. ........... | 429/34 |

FOREIGN PATENT DOCUMENTS

| | | |
|---|---|---|
| JP | 2000-012054 | 1/2000 |
| JP | 2000-109792 | 4/2000 |

OTHER PUBLICATIONS

Hawley's Condensed Chemical Dictionary, 14 Ed., definition of "Vulcanization".*
Patent Abstract of Japan 08 185875 Jul. 16, 1996.
PCT First Page of Publication WO99/53559 Oct. 21, 1999.

* cited by examiner

*Primary Examiner*—Patrick Joseph Ryan
*Assistant Examiner*—Julian Mercado
(74) *Attorney, Agent, or Firm*—Arent Fox PLLC

(57) ABSTRACT

A liquid thermosetting sealing agent for a polymer electrode membrane fuel cell having separators and a membrane electrode assembly laminated, whose the viscosity at the application is from 1,000 to 9,000 Pa·S, can be used to prepare a highly durable seal for a polymer electrode membrane fuel cell, to produce a single cell having a highly durable seal and to recover the fuel cell whose seal becomes abnormality.

6 Claims, 15 Drawing Sheets

(S1)

f : 500 × 500 × 5mm
$q_0$ : Sealing Agent (Applied 400 × 400mm)

(S11)

f ; 500 × 500 × 5mm
q₀ ; Sealing Agent (Applied to 400 × 400mm)

(S12)

(S13)

Surf. Press. $\alpha$ of Seal > Surf. Press. $\beta$ of Diffusion Layer

Surf. Press. $\alpha$ of Seal $\leq$ Surf. Press. $\beta$ of Diffusion Layer

LIQUID THERMOSETTING SEALING AGENT FOR POLYMER ELECTRODE MEMBRANE FUEL CELL, SINGLE CELL FORMED WITH SEALING AGENT, ITS PROCESS, AND PROCESS FOR REGENERATING POLYMER ELECTRODE MEMBRANE FUEL CELL

This is a Continuation Application of application Ser. No. 09/877,233, filed on Jun. 11, 2001. The disclosure of the prior application is hereby incorporated by reference herein in its entirety.

BACKGROUND OF THE INVENTION

1. Field of the Invention

The present invention relates to a liquid thermosetting sealing agent for a polymer electrode membrane fuel cell composed of membrane electrode assembly having separators laminated thereon, a single cell of a polymer electrode membrane fuel cell and a polymer electrode membrane fuel cell having a seal formed by the liquid thermosetting the sealing agent, a process for producing or regenerating them.

2. Description of Related Arts

A fuel cell system is a power generation system mainly due to a fuel cell in which hydrogen as a fuel gas is supplied to the side of a hydrogen pole of the fuel cell, while oxygen as an oxidant gas is supplied to the side of an oxygen pole of the fuel cell to generate electric power. The fuel cell system, which directly converts chemical energy into electric energy, has been recently attracted from the viewpoints of high power generation efficiency and very little exhaust of harmful substances.

Configuration of the general fuel cell system will now be described by referring to FIGS. 1 and 2.

As shown in FIGS. 1 and 2, a fuel cell FC is composed of single cells C comprising separators 1 and 2 and a membrane electrode assembly MEA (hereinafter referred to as "MEA", and is composed of a lamination of approximately 200 single cells C.

The separators 1 and 2 cut off the fuel gas, the oxidant gas and a coolant, and possesses passages $P_H$ and $P_O$, respectively for introducing the fuel gas and the oxidant gas into the interior of the MEA, and a passage $P_W$ for introducing the cooling water into the MEA to allow the MEA to cool. On the other hand, an oxygen pole $E_O$ (cathode) and a hydrogen pole $E_H$ (anode) are provided on the MEA. Also, diffusion layers D are provided on the MEA at both sides of the oxygen pole $E_O$ and the hydrogen pole $E_H$. The MEA is thus configured.

As the material for the electrolyte membrane M, for example, a perfluorocarbon sulfonic acid membrane, which is a proton-exchanging membrane, has been used. This electrolyte membrane has a plurality of proton-exchanging groups in the solid macromolecule, exhibits a proton specific resistance as low as approximately 20 Ω/cm proton and, thus, acts as a proton-conductive electrolyte. As described above, because of using the electrolyte membrane M, the fuel cell FC is referred to as a polymer electrode membrane fuel cell.

A catalyst contained in the oxygen pole $E_O$ is a catalyst which produces oxygen ions form oxygen, while a catalyst contained in the hydrogen pole $E_H$ is a catalyst which produces protons from hydrogen.

Outside the oxygen pole $E_O$, a gas passage $P_O$ at the oxygen pole side which allows a supply gas as the oxidant gas for flowing into the oxygen pole $E_O$, is provided, and outside of the oxygen pole $E_H$, a gas passage $P_H$ at the hydrogen pole side which allows a supply hydrogen $H_2$ as the fuel gas for flowing into the hydrogen pole $E_H$, is provided. The inlet and the outlet of the gas passage $P_O$ at the oxygen pole side are connected to an air-supplying apparatus (not shown), and the inlet and the outlet of the gas passage $P_H$ at the hydrogen pole side are connected to a hydrogen-supplying apparatus (not shown)

The diffusion layers D are each provided in contact with the gas passage $P_O$ and the gas passage $P_H$ on the surface of the separators 1 and 2, respectively, has a function of transmitting the electrons between the electrode $E_H$ and the separator 2, and the function of diffusing the fuel gas or the oxidant gas, and generally is composed of carbon fibers.

The separators 1 and 2 each is composed of carbon type materials, has a function of separating the fuel gas and the oxidant gas from the coolant gas, respectively, and possesses a passage $P_W$ as well as the above passages $P_H$ and $P_O$, and has an electron-transmitting function.

In this fuel cell FC, when the supply air is supplied into the gas passage $P_O$ at the oxygen pole side and the fuel gas is supplied into the gas passage $P_H$ at the hydrogen pole side, the hydrogen is ionized into protons by the catalytic function of the catalyst at the hydrogen pole $E_P$, and the produced protons are migrated in the electrolyte membrane M to arrive at the oxygen pole $E_O$. The protons arriving at the oxygen pole $E_O$ are readily reacted with oxygen ions produced from the oxygen contained in the supply air to form water. The supply air containing the water thus produced and the oxygen remaining unused is discharged from the outlet of the fuel cell FC at the oxygen pole side as an exhaust gas (the exhaust gas having a large moisture content). Electrons e⁻, which are produced during the ionization of the hydrogen, reach the oxygen pole $E_O$ via an external load such as a motor.

In the fuel cell FC having such a configuration, the fuel gas, the supply gas and the coolant are supplied into each single cell via dependent passages $P_H$, $P_O$, and $P_W$, respectively. In order to partition each system in a gas sealed manner, a technique for applying a seal $q_1$ becomes important.

Although the portions where the seal $q_1$ should be applied somewhat depends upon the construction of the fuel cell FC, for example, in the case of the fuel cell shown in FIGS. 1 and 2, there can be mentioned portions around the communication ports pierced through the fuel cell for the purpose of supplying the fuel cell, the humidified water, and the coolant into respective single cells C, an outer circumference of the membrane electrode assembly MEA, an outer circumference of the surface of the coolant passage allowing the coolant for flowing along the surface of the separator in order to cool the surface of the separator, and outer circumferences of the separators 1 and 2, such as front and rear surfaces thereof.

As the sealing technique for gas-tightly sealing such portions, a technique in which a laminate comprising sheets or O-rings composed of a fluorine- or silicone-series organic rubber compressed and laminated with a liquid curing material which is adhered and cured is used to apply a seal due to the resilient force of the rubber, a technique in which graphite or any other ceramic fiber sheets are compressed and the compressed material is sealed in a state of left fastening, or a mechanical sealing techniques using a caulking, etc. has been conventionally utilized.

If the fuel cell is a portable type or is carried on a vehicle, etc., the fuel cell is required to have a restricted size. Particularly, the single cell making up the fuel cell FC is required to be thin. For this reason, it is an important how to produce the membrane electrode assembly MEA and the separators 1 and 2 in a thinner form particularly, since the separators 1 and 2, which are directly in contact with the seal $q_1$, are mainly composed of brittle carbon type materials, they are easily fractured at the time of the lamination when they are configured to be a thin form.

For this reason, it is the present situation that a soft sealing material having an adequate resilient force such as an organic rubber is used to apply the seal $q_1$.

Recently, the sealing agent for applying the seal $q_1$ to the single cell C of the fuel cell has been developed (see WO99/53559). According to this publication, the sealing agent comprises an oligomer having prescribed addition-polymerization properties, a curing agent having at least two hydrogen atoms bonded to silicon atom, and a hydrosilylation catalyst.

However, when a seal is applied to the single cell of the fuel cell utilizing any of the conventional techniques, there poses the following problems:

(1) In the operation of the fuel cell FC, the atmosphere at the power generation portion is at a high temperature and under a highly acidic condition and the coolant is flowing at the cooling portion; thus, the seal is required to have durability, which can separate such severe atmospheres from each other as a rule. However, if the conventional adhesive is used to apply a seal (if a seal is formed by the intervention of organic rubber or by using an adhesive), it is difficult to secure the durability over a prolonged period of time. Particularly, only by the function of the adhesion property due to the sealing agent it is difficult to secure the durability under these atmospheres over a prolonged period of time.

For this reason, it is desired that the surface pressure during the lamination of the single cells is kept substantially constant to secure the sealing properties and the difference in the stresses is decreased to prevent the fracture.

(2) In the fuel cell FC composed of laminating the separators 1 and 2 and the membrane electrode assembly MEA, when the normal thermosetting adhesive is intervened between the laminates among the separators 1 and 2 and the membrane electrode assembly MEA to form seals, the thermosetting sealing agent for a polymer electrode membrane fuel cell, the membrane electrode assembly MEA, and the separator 1 are exposed to the same heating conditions. However, since the electrolyte membrane M of the membrane electrode assembly MBA has a temperature which decreases a kinetic viscosity-elastic modulus as low as from 75 to 110° C., the electrolyte membrane M is unduly crept when being exposed under such conditions over a prolonged period of time to decrease the mechanical durability. Accordingly, it is desired to thermally cure the thermosetting sealing agent for a polymer electrode membrane fuel cell at a temperature as low as possible for a minimized period.

A typical example of sealing agent, which has been commonly utilized, includes a fluorine-series sealing agent, which can be used at a high temperature, at a high humidity, and under a strongly acidic conditions. The curing temperature of this sealing agent is not less than 150° C. If this sealing agent is merely thermally cured at a temperature lower than the appropriate temperature as disclosed in WO99/53559, the durability of the resulting seal is decreased. For this reason, the development of the sealing techniques has been desired, which can impart sufficient durability to the resulting seal $q_1$ without deteriorating the electrolyte membrane M.

(3) In the fuel cell composed of the lamination of the separator 1 with the membrane electrode assembly MEA, when the seal $q_1$ is intervened between the lamination of the separator 1 and the membrane electrode assembly MEA, unevenness of the thickness of the membrane electrode assembly MEA causes unevenness in the gap of the seal. Due to the unevenness of each gap in the laminate state, difference in stresses is generated at the portion where the separators 1 and 2 are in contact with the seal $q_1$. With regard to this difference in stresses, a separator produced by caving sintered graphite or a separator formed by mixing carbon powders with 15–30% of resin, which has low fracture stress, is easily fractured at the time of lamination and fastening.

For this reason, it has been desired to provide a process for the application of the seal in which difference in the stresses to unevenness of the gap of each seal is difficult to be brought about.

(4) The thermal strain and the seal stress (to the carbon type separator) vary depending upon the hardness of the seal $q_1$ after curing. Specifically, a seal $q_1$ having relatively low hardness, which is a raw material having low cross-linking degree, is easy to undergo thermal strain, but due to its low degree of increasing the counterforce against the amount of the compression, the difference between stress between the seals $q_1$ in the laminated state of the single cell C becomes small.

In contrast, a seal $q_1$ having relatively low hardness can decrease the thermal strain, but has large difference in the stresses in the laminated state of the single cell.

Consequently, it has been desired to provide a sealing agent for a polymer electrode membrane fuel cell having hardness with well-balanced properties between the two antimony properties and to provide a process for producing a polymer electrode membrane fuel cell FC utilizing such a sealing agent.

(5) Moreover, if the seal $q_1$ is deteriorated or if any other abnormality of the seal $q_1$ occurs, the fuel cell must be immediately recovered. Such recovery requires much more times and labors. Consequently, there is a demand to develop a process for easily recovering the fuel cell by applying a seal $q_1$ having high durability under the utilization of the fuel cell.

SUMMARY OF THE INVENTION

An object of the present invention is to solve these problems associated with the prior art and to develop a liquid sealing agent, which can form a uniform seal at a relatively low temperature, and which can impart the formed seal to durability under the operating conditions of the fuel cell over a prolonged period of time.

Another object of the present invention is to provide a single cell having high durability utilizing such a sealing agent, to provide a process for producing the single cell, and to provide a fuel cell having the single cells laminated.

Still another object of the present invention is to provide a process for recovering a fuel cell which can easily recover the fuel cell when the abnormality such as deterioration of the seal in the fuel cell, occurs.

These and other objects can be attained by the present invention:

According to the present invention, there is provided a liquid thermosetting sealing agent for a polymer electrode membrane fuel cell having separators and a membrane electrode assembly laminated, the viscosity of said liquid thermosetting sealing agent at the application being from 1,000 to 9,000 Pa·S.

By having such a configuration, the surface pressure during the lamination of separators and the membrane electrode assembly, making it possible to secure a high sealing properties and forming a seal having a uniform size. For this reason, the liquid thermosetting sealing agent for a polymer electrode membrane fuel cell configured as described above can form a highly durable seal even under severe conditions such as a high temperature, a high humidity, and a highly acidic condition.

In the liquid thermosetting sealing agent for the polymer electrode membrane fuel cell according to the present invention, the temperature range for the curing condition of said liquid thermosetting sealing agent for the polymer electrode membrane fuel cell is from 100 to 130° C., and the controlled temperature range thereof is a predetermined temperature $\pm 5°$ C., and more preferably the temperature range for the curing condition of said liquid thermosetting sealing agent for the polymer electrode membrane fuel cell is $120\pm5°$ C.

By such a configuration, a seal having little thermal strain and excelling in durability can be formed without curing the liquid thermosetting sealing agent under any conditions where the electrolyte membrane making up the polymer electrode membrane fuel cell can be formed.

In the liquid thermosetting sealing agent for the polymer electrode membrane fuel cell according to the present invention, the hardness of the liquid thermosetting sealing agent for the polymer electrode membrane fuel cell after curing measured according to a hardness test using a durometer at shore A defined in JIS K 6253 is preferably in the range of from 30 to 70°.

By such a configuration, since the liquid thermosetting sealing agent is cured under the condition where the separators and the membrane electrode assembly are in contact with each other, and since the initial height of the seal is flowed-up with the thickness of the membrane electrode assembly when being fastened, the difference in seal stresses due to unevenness of thickness of the membrane electrode assembly can be highly suppressed.

In the liquid thermosetting sealing agent for the polymer electrode membrane fuel cell according to the present invention, said liquid thermosetting sealing agent for the polymer electrode membrane fuel cell is preferably based on a silicone series elastomer, a fluorine series elastomer, or isobutylene series elastomer.

The silicone series elastomers, fluorine series elastomers, and isobutylene series elastomers are those which have been commonly used as the thermosetting curing agent and commercially available. In the present invention, the use of such a material provide the liquid thermosetting sealing agent for the polymer electrode membrane fuel cell according to the present invention in inexpensive and with ease.

According to the present invention which can attained the objects mentioned previously, there is provided a single cell comprising the lamination of separators and a membrane electrode assembly, and having the gaps between each separator and the membrane electrode assembly tightly sealed with a seal, the seal being formed by thermally curing the liquid thermosetting sealing agent for the polymer electrode membrane fuel cell according to the present invention.

By such a configuration, a single having a highly durable seal even under severe conditions such as a high temperature, a high humidity, and a highly acidic condition formed can be provided. Also, a single cell having a little difference in the seal stresses due to unevenness of the seal gap can be provided. There is a little possibility to fracture the separator when the single cells according to the present invention are laminated. Because of having a seal with resistance to thermal strain and fracture resistance to fracture by bending in a well-balance manner, the single cell having highly improved durability can be provided.

According to the present invention which can attained the objects mentioned previously, there is provided a process for producing a single cell comprising the lamination of separators and a membrane electrode assembly, and having the gaps between each separator and the membrane electrode assembly tightly sealed with a seal, which comprise the following steps:

a step for applying the liquid thermosetting sealing agent for a polymer electrode membrane fuel cell according to the present invention between each of the separator and the membrane electrode assembly at an application rate preset depending upon the viscosity of said liquid thermosetting sealing agent for the polymer electrode membrane fuel cell, and the width and the height of the resulting seal; and a step for curing said liquid thermosetting sealing agent for the polymer electrode membrane fuel cell at a temperature range of from 100 to 130° C. for a predetermined period of time.

By such a configuration, a single cell having a highly durable seal even under severe conditions such as a high temperature, a high humidity, and a highly acidic condition formed can be produced with good productivity. When a fuel cell is made up by laminating such single cells produced as described above, there is a little possibility to fracture the separator.

According to the present invention which can attained the objects mentioned previously, there is provided a polymer electrode membrane fuel cell composed of the lamination of a plurality of the single cell according to the present invention.

By such a configuration, a polymer electrode membrane fuel cell having a little deterioration of the membrane electrode assembly making up the fuel cell and having a highly durable seal formed can be provided.

According to the present invention which can attained the objects mentioned previously, there is provided a process for recovering a polymer electrode membrane fuel cell comprising a plurality of single cells each comprising the lamination of separators and a membrane electrode assembly, and each having the gaps between each separator and the membrane electrode assembly tightly sealed with a seal, said process recovering an abnormal seal in the case where the abnormality of the seal occurs; which comprise the following steps:

a step for removing the single cell having the abnormal seal;

a step for removing the abnormal seal;

a step for applying the liquid thermosetting sealing agent for a polymer electrode membrane fuel cell according to the present invention between each of the separator and the membrane electrode assembly at an application rate preset depending upon the viscosity of said liquid thermosetting sealing agent for the polymer electrode membrane fuel cell, and the width and the height of the resulting seal; and a step for curing said liquid thermosetting sealing agent for the polymer electrode membrane fuel cell at a temperature range of from 100 to 130° C. for a predetermined period of time.

By such a configuration, a single cell having a highly durable seal even under severe conditions such as a high temperature, a high humidity, and a highly acidic condition formed can be produced with good productivity. Accordingly, the abnormal seal can be replaced with the highly durable seal to recover the fuel cell as a highly durable fuel cell.

DESCRIPTION OF THE PREFERRED EMBODIMENTS

The embodiments of the present invention will now be described by referring to the attached drawings. However, it should be understood that the present invention is not restricted to such embodiments.

Figure 1:
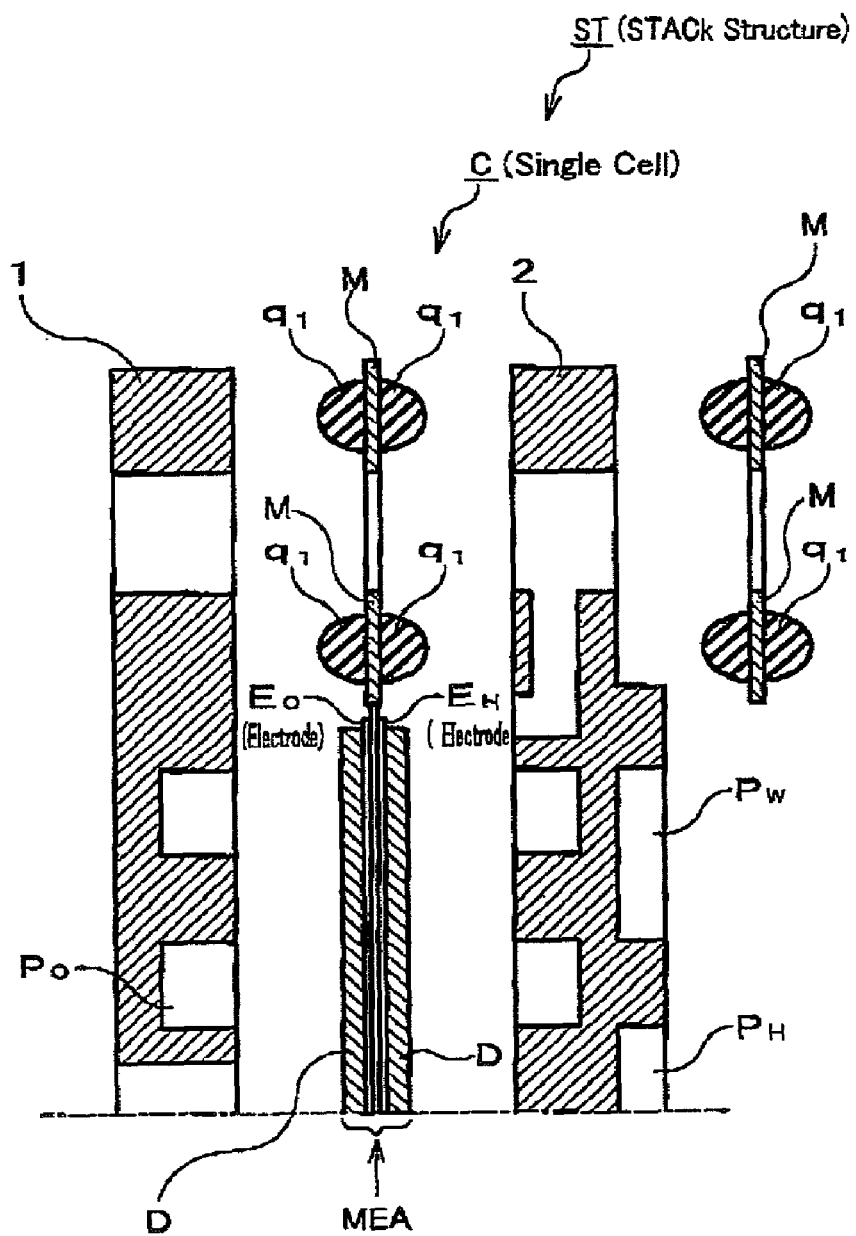
FIG. 1 is a drawing showing a main portion of a stack structure having a seal $q_1$ according to the present invention.
Figure 2:
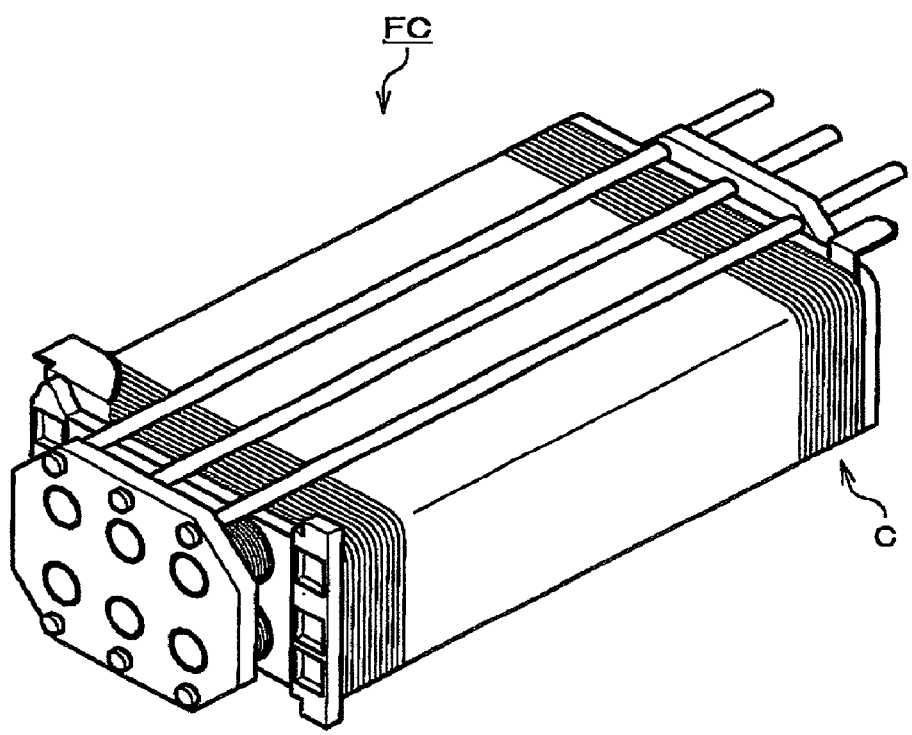
FIG. 2 is a drawing schematically showing a fuel cell having a seal $q_1$ according to the present invention.

FIG. 1 is a drawing showing a main portion of a stack structure having a seal $q_1$ according to the present invention, and FIG. 2 is a drawing schematically showing a fuel cell having a seal $q_1$ according to the present invention.

As shown in FIGS. 1 and 2, a fuel cell 1 is composed of approximately 2000 single cells C each comprising separators 1 and 2 and an membrane electrode assembly MEA laminated with each other. A seal $q_1$ is applied to the fuel cell FC in order to supply a fuel gas, an oxidant gas, and a coolant gas respectively to separate passages $P_H$, $P_O$, and $P_W$ so as to separate these passages.

The seal $q_1$ is applied to the portions around the communication ports pierced through the fuel cell for the purpose of supplying the fuel cell, the humidified water, and the coolant into respective single cells C, an outer circumference of the membrane electrode assembly MEA, an outer circumference of the surface of the coolant passage allowing the coolant for flowing along the surface of the separator in order to cool the surface of the separator, and outer circumferences of the separators 1 and 2, such as front and rear surfaces thereof. The atmosphere at the power generation portion is at a high temperature and under a highly acidic condition and the coolant is flowing at the cooling portion; thus, the seal is required to have durability, which can separate such severe conditions from each other. A sealing technique is required which can applied not only to a separator produced by caving sintered graphite or a separator formed by mixing carbon powders with 15–30% of resin, which has low fracture stress, which is, thus, easily fractured at the time of lamination and fastening, but also to a separator made of swelled graphite or a metal base, which is difficult to be fractured by bending. The first embodiment of the present invention concerns a liquid thermosetting agent for a polymer electrode membrane fuel cell for forming a seal, which can separate gases under such severe conditions in a durable manner (hereinafter referred to as "liquid sealing agent").

(Liquid Sealing Agent)

The liquid sealing agent according to the present invention comprises, as a base which has been used in the conventional liquid sealing agent for a polymer electrode membrane fuel cell, such as a silicone series elastomer, a fluorine series elastomer, or isobutylene series elastomer (e.g., polyisobutylene series elastomer). The liquid sealing agent according to the present invention is a composition, which is in a liquid form at normal temperature, has a viscosity ranging from 1,000 to 9,000 Pa·S at the time of application (the viscosity before curing), and is cured by heat or steam.

(Viscosity of Liquid Sealing Agent)

The liquid sealing agent according to the present invention may have the composition similar to that of the conventional thermosetting adhesive as long as this viscosity range can be accomplished. If the viscosity at the application of the liquid sealing agent is less than 1,000 Pa.s, the shape is easily deformed at the application or after the application and, thus, a seal having a desired shape cannot be obtained. Conversely, if it exceeds 9,000 Pa·S, the discharging the liquid sealing agent during the application is changed for the worse, which makes it difficult to apply the liquid sealing agent in a desired shape unless the application rate is set to very slow. This unduly decreases the productivity. This viscosity range is obtained by the evaluation of the applicability of the sealing agent according to the working Example 1, which will be described later on.

Consequently, it is essential for the liquid sealing agent according to the present invention to have a viscosity range of from 1,000 to 9,000 Pa·S, which is the range capable of maintaining a desired shape after the application and curing.

(Thermosetting Conditions of Liquid Sealing Agent)

The liquid sealing agent according to the present invention having the viscosity range as described above is thermally cured (thermoset) under a specific temperature control. This is thermoset under predetermined conditions to from a seal $q_1$ in the polymer electrode membrane fuel cell.

Specifically, the liquid sealing agent according to the present invention forms a seat at the portion where the seal $q_1$ is applied including around the communication ports pierced through the fuel cell for the purpose of supplying the fuel cell, the humidified water, and the coolant into respective single cells C, an outer circumference of the membrane electrode assembly MEA, an outer circumference of the surface of the coolant passage allowing the coolant for flowing along the surface of the separator in order to cool the surface of the separator, and outer circumferences of the separators 1 and 2, such as front and rear surfaces thereof. With regard to the thermosetting condition at this time, the thermosetting temperature is in the range of from 100 to 130° C., preferably from 110 to 130° C., and most preferably 120° C.±5° C. Furthermore, it is advantageous to control the temperature range to be the set temperature ±5° C. under the above thermosetting condition. If the thermosetting temperature is less than 100° C., desirable resistance to thermal strain cannot be obtained. Conversely, if it exceeds 130° C., the electrolyte membrane M is unduly crept.

Specifically, with regard to the thermosetting condition for the liquid sealing agent according to the present invention, considering the creep of the electrolyte membrane M, it is desirable for the thermosetting temperature to be as low as possible. With regard to the thermosetting period, it is preferred to be within 5 hours, taking into the consideration of the productivity. It is noted that when the liquid sealing agent according to the present invention is used as a normal adhesive, it is normally cured under the thermosetting conditions at 150° C. for approximately 1 hour.

In the present invention, as illustrated in the following working Example 2, the optimum thermosetting conditions are set by measuring the amount of strain amongst the high temperature durability tests. As a result, it has been experimentally discovered that in the case where the liquid sealing agent according to the present invention is thermally cured at 110° C. over a period of from 4 to 5 hours, a stain amount corresponding to the case where it is thermally cured at 150° C. for 1 hour. Subsequently, we have conducted the thermosetting of the liquid sealing agent at 115° C., 120° C. and 125° C., i.e., at a temperature interval of 5° C. over a period of 1 hour, 2 hours, 3 hours, 4 hours, and 5 hours, and, as a result, it has been found that under the thermosetting conditions of 150° C. and 3 hours, a thermal strain amount corresponding to the thermosetting conditions of 150° C. and 1 hour can be obtained. Consequently, considering unevenness of the oven temperature which is ±5° C., it is decided that the thermosetting conditions of 120° C.±5° C. are the optimum the thermosetting conditions, which can minimize the thermal strain amount as well as the damage of the electrolyte membrane M.

Via the experimental processes described above, the optimum thermosetting conditions can be found for another liquid sealing agent having a different composition.

By thermosetting (thermally curing) the liquid sealing agent according to the present invention as described above, the seal $q_1$ is formed between the separators 1 and 2 and the membrane electrode assembly MEA. In the conventional technique utilizing a solid seal having a prescribed size, difference in the seal stresses occurs due to unevenness of the thickness of the membrane electrode assembly MEA to cause fracture of the separator. In contrast, since the seal formed by thermosetting the liquid sealing agent according to the present invention is formed by thermosetting the liquid sealing agent according to the present invention in the state where the liquid sealing agent is applied between the seal gap, i.e., in the state where the separator 1 and the membrane electrode assembly MEA are in contact with each other, the initial height of the seal $q_1$ can be followed up with respective membrane electrode assembly MEA when they are fastened. Accordingly, the difference in the stresses due to unevenness of the membrane electrode assembly MEA can be minimized. For this reason, the liquid sealing agent according to the present invention can applied not only to a separator produced by caving sintered graphite or a separator formed by mixing carbon powders with 15–30% of resin, which has low fracture stress, which is, thus, easily fractured at the time of lamination and fastening, but also to a separator made of swelled graphite or a metal base, which is difficult to be fractured by bending (see the following working Example 3).

(Hardness of Liquid Sealing Agent After Curing)

When the liquid sealing agent according to the present invention is cured under the predetermined conditions, a desired seal $q_1$ is formed at a predetermined position of the fuel cell FC between the separators 1 and 2 and the membrane electrode assembly MEA. At this time, the hardness of the seal $q_1$, measured according to a hardness test using a durometer at shore A defined in JIS K 6253, is preferably in the range of from 30 to 70°. To be specific, the hardness of the cured seal has a relation with the thermal stain and the seal stress to the carbon type separator 1. The seal having a relatively low hardness tends to be thermally strained due to its low cross-linking density, but such a seal can decrease the difference in the stresses between the separators 1 and 2 and the membrane electrode assembly MEA due to it small degree of decreasing the counter force. In contrast, a seal having a relatively high hardness has an increased degree of decreasing the stress against the compression amount, but has a high resistance to thermal strain. Considering these characteristics, the hardness of the seal formed after the thermal curing is defined.

If the hardness measured according to a hardness test using a durometer at shore A is less than 30° C., the sufficient durability cannot be obtained. Conversely, the seal having hardness exceeding 70° undesirably has a surface pressure higher then the diffusion layer compressed in the same amount.

Specifically, with regard to the liquid sealing agent according to the present invention, when a pressured is applied at the time of curing which is in no loading state, the position at which the surface pressure occurs is that of the diffusion layer D and, thus, the surface pressures of the seal and the diffusion layer D are increased respectively in proportion to the compression amount. At this time, if the surface pressure of the seal is larger than that of the diffusion layer, the load assigned to the seal $q_1$ becomes higher. In this case, although the initial sealing property is high, the load is undergone at the portion of the separators 1 and 2 in contact with the seal $q_1$. As a result, it becomes difficult to uniformly apply a load over the entire surface of the membrane electrode assembly MEA. Particularly, at the end portion of the membrane electrode assembly MEA nearer the seal $q_1$, load can be applied only with difficulty. On the other hand, if the surface pressure of the seal is not larger than that of the diffusion layer, the load assigned to the seal $q_1$ become uniform or lower than that of the diffusion layer D and, thus, uniform load can be applied over the entire surface of the membrane electrode assembly MEA. As a result, the contact resistance between the separators 1 and 2 and the membrane electrode assembly MEA and the diffusion properties of the gases become uniform, stabilizing the power generation performance. This makes it difficult to cause the curvature and distortion of the separators 1 and 2 during the stacking. For this reason, the seal having a hardness exceeding 70° is not preferable, because the surface pressure of the seal becomes higher than that of the diffusion layer D.

The hardness of the cured seal within the above range can be obtained by suitably selecting various additives well known in the art, such as crosslinkers, and components, which forms a cross-linked structure.

Next, a process for producing a single cell for the polymer electrode membrane fuel cell, a process for producing a fuel cell, and a process for recovering the fuel cell according to another embodiments of the present invention will now be described.

(Application of Liquid Sealing Agent)

First, the liquid sealing agent according to the present invention is applied to prescribed portions of the separators 1 and 2, and the membrane electrode assembly MEA to be applied at a prescribed application pressure and at a prescribed application rate (Step 1).

The application pressure in this case is not restricted as long as it is a pressure capable of applying the liquid sealing agent to the portions between the separators 1 and 2 and the membrane electrode assembly MEA, and suitably selected considering the viscosity of the liquid sealing agent according to the present invention, etc. It is generally in the range of from 300 to 500 kPa. The application rate is previously detected by a previous experiment which determines the range capable of applying the liquid sealing agent at a given application pressure within the above range.

Specifically, as shown in the working Example 1, which will be described later on, even when the liquid sealing agent according to the present invention is applied to the prescribed application pressure, it is not possible to form a seal having a desired size unless the application rate is within a prescribed range.

Figure 20:
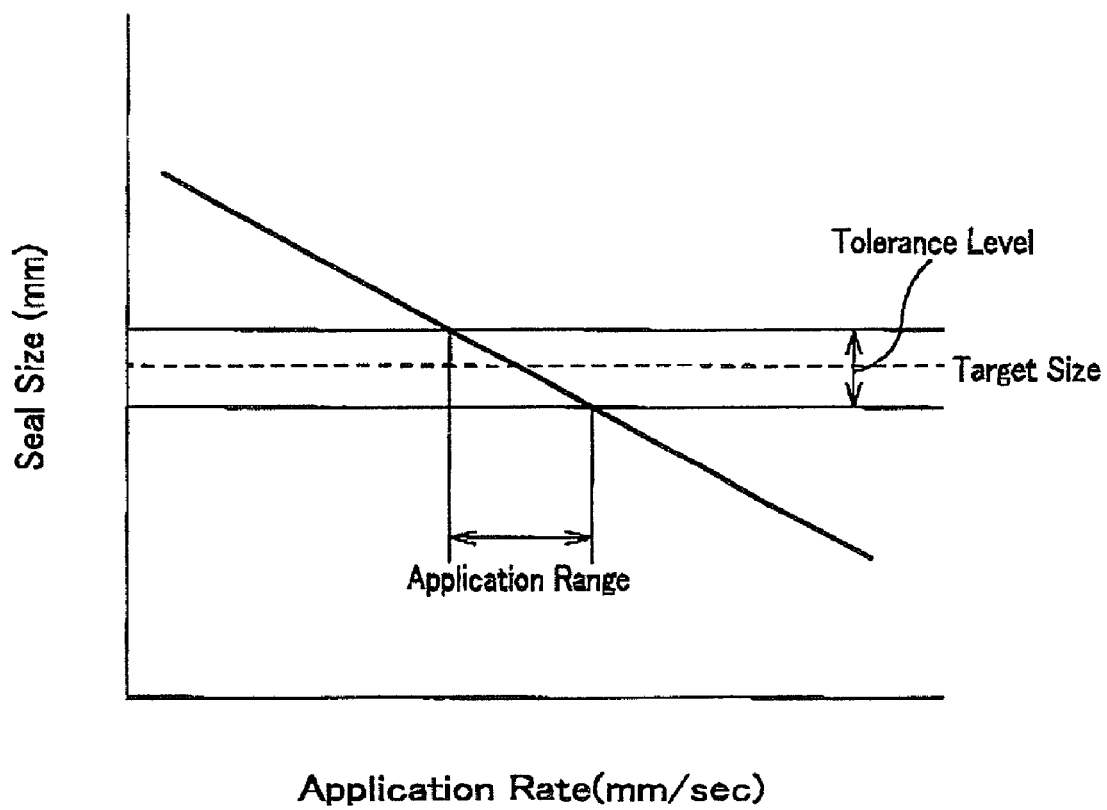
FIG. 20 is a graph schematically showing the relationship between the application rate of the seal $q_0$ according to the present invention and the size of the resulting seal.

When the application pressure is kept constant, the application rate region, which provides a seal having a desired width and a desired thickness, can be detected. Generally, taking a seal size (width or thickness) as the vertical axis, and an application rate as the horizontal axis, a graph as shown in FIG. 20 can be obtained.

The application rate out of the appropriate range cannot provide desired seal, even if the liquid sealing agent according to the present invention having a viscosity within the range of the present invention is used (see Tables 2 to 4).

(Curing of Liquid Sealing Agent)

Subsequently, the liquid sealing agent according to the present invention applied as described above is thermally cured under the above mentioned thermosetting conditions, i.e., at 100–130° C., preferably 110–130° C. and with temperature control range of ±5° C., the most preferably 120° C.±5° C. to form a desired seal (Step 2).

This makes it possible to form a highly durable seal onto the single cell C without thermally curing the seal under the condition where the electrolyte membrane M is deteriorated.

Also, the possibility of the fracture of the separator of the single cell C during the lamination of the single cells to make up a fuel cell can be decreased.

(Recovery of Fuel Cell)

A similar process can be used to recover the fuel call in which abnormality occurs due to exhaust of the seal $q_1$, etc.

Specifically, first, a single cell having an abnormal seal is removed (Step 1), the abnormal seal is removed (Step 2), the liquid sealing agent according to the present invention is applied as in the step described previously (Step 3), and then the liquid sealing agent according to the present invention is thermally cured under the prescribed conditions (Step 4). This can apply a highly durable seal $q_1$ between the separators 1 and 2 and the membrane electrode assembly MEA. In this embodiment, the seal to be removed and recovered may be the seal formed from the liquid sealing agent according to the present invention and the existing seal.

As described above, a highly durable seal can easily be applied onto the single cell C without thermally curing the seal under the condition where the electrolyte membrane M is deteriorated, the abnormal seal can be replaced with the highly durable seal $q_1$ to recover the fuel cell as one having high durability.

EXAMPLES

The present invention will now be described in greater detail by the working Examples and comparative Examples. It should be noted that the present invention should not be restricted to these Examples, and can be varied within the scope and the sprit of the present invention.

In the following Examples, the liquid sealing agent according to the present invention is referred to as "inventive sealing agent $q_0$", a seal formed by applying the inventive sealing agent $q_0$, followed by thermally treating to be cured is referred to as "inventive seal $q_1$", a seal formed by applying a comparative liquid sealing agent, followed by thermally treating to be cured is referred to as "comparative seal $q_1'$, and a seal which has been previously from in a given width and a given height is referred to as "solid seal r".

Example 1

(Evaluation of Applicability of Liquid Sealing Agent)

In order to evaluate applicability of various liquid seals, liquid thermosetting sealing agents each comprising a silicone series-, a fluorine series-, or a polyisobutylene series elastomer as a main ingredient, and each having a viscosity ranging from 300 to 12,000 Pa·S were applied on a test sample composed of an aluminum plate. The cross-sectional sizes of the cured seals were measured to be evaluated. Table 1 shows the liquid sealing agents and the application conditions.

TABLE 1

Construction of Sealing Agents and Application Conditions

| Items | Construction or Condition |
|---|---|
| Liquid Sealing Agent | Liquid thermosetting sealing agents each comprising a silicone series-, a fluorine series-, or a polyisobutylene series elastomer as a main ingredient, and each having a viscosity ranging from 300 to 12,000 Pa · S |

TABLE 1-continued

Construction of Sealing Agents and Application Conditions

| Items | Construction or Condition |
|---|---|
| Application Length | Applied on 200 × 50 × 3 mm Al plate in a linear form of 150 mm length |
| Inner Diameter of Application Nozzle[1] | 0.6 mm |
| Application Rate | 1–10 mm/sec |
| Application Pressure | 500 kPa |
| Application Apparatus | TCD-200 available from SONY CO., LTD. |

[1]The nozzle diameter was set at the minimum value of the application apparatus used herein to set the condition where the discharge was most difficult and the cross-sectional shape of the discharged liquid seal was difficult to be changed.

Figure 3:
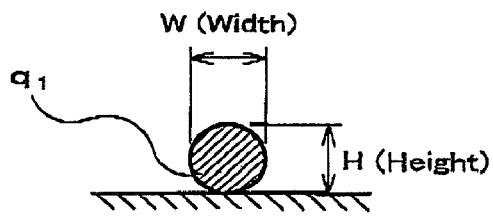
FIG. 3 is a drawing schematically showing the cross-section of the seal $q_1$ according to the present invention applied on a substrate.

As shown in Table 1, each sealing agent was applied on a test sample with 200 mm in length, 50 mm in width and 3 mm in thickness made of an aluminum plate through a nozzle having a 0.6 mm inner diameter at an application rate of from 1 to 10 mm/sec, at constant application pressure of 500 kPa in a liner form of 150 mm length. The nozzle diameter was set at the minimum value of the application apparatus used herein to set the condition where the discharge was most difficult and the cross-sectional shape of the discharged liquid seal was difficult to be changed. After the surface of the sample was washed with an organic solvent, etc., each of various liquid sealing agents was applied. Thereafter, thermosetting under the prescribed condition was carried out in each case to thermally cure each of the liquid sealing agent whereby the inventive seal $q_1$ substantially having a cylindrical shape with height H and width W as shown in FIG. 3 was formed. With regard to the target size of the resulting seal $q_1$, the width W was 0.6±0.1 mm, and the height H was 0.5±0.1 mm. The inventive seal $q_1$ was evaluated for the cross-sectional size and visibly evaluated for the shape viewing right down. The applicability of the liquid sealing agent was totally evaluated from these results. Tables 2 to 4 show the applicability of various liquid sealing agents comparing Examples with Comparative Examples.

TABLE 2

Evaluation of Silicone Series Sealing Agents

| | No. | Viscosity of Liquid Sealing Agent (Pa · s) | Application rate (mm/sec) | Evaluation of Size after curing[1] | Visible[2] | Total[3] |
|---|---|---|---|---|---|---|
| Example | 1 | 1070 | 6 | G | G | G |
| | 2 | 1210 | 5 | G | G | G |
| | 3 | 2600 | 4 | G | G | G |
| | 4 | 4750 | 3 | G | G | G |
| | 5 | 6600 | 2 | G | G | G |
| | 6 | 8300 | 1 | G | G | G |
| | 7 | 9000 | 1 | G | G | G |
| Comp. Example | 8 | 560 | 10 | P1 | N | P |
| | 9 | 960 | 10 | P1 | N | P |
| | 10 | 960 | 8 | P1 | N | P |
| | 11 | 1070 | 8 | P2 | G | P |
| | 12 | 1210 | 6 | P2 | G | P |
| | 13 | 2600 | 5 | P2 | G | P |
| | 14 | 4750 | 4 | P2 | G | P |
| | 15 | 6600 | 3 | P2 | G | P |
| | 16 | 8300 | 2 | P2 | G | P |
| | 17 | 9200 | 1 | P2 | P | P |
| | 18 | 10400 | 1 | P2 | P | P |
| | 19 | 11600 | 1 | P2 | P | P |

[1]In Evaluation of size, G indicates good in which the width was 0.6 ± 0.1 mm, and the height was 0.5 ± 0.1 mm, P1 indicates poor level 1 in which the width exceeded 0.7 mm, and the height was lower than 0.4 mm, P2 indicates poor level 2 in which the width was lower than 0.5 mm, and the height was lower than 0.4 mm.
[2]G, N, and P described in the column, "Visible", indicates the results of the observation, where G indicates good, N indicates substantially good, and P indicates poor.
G: formed into substantially target size.
N: formed in the state of being dropped in the wide direction
P: formed in the state of being partially shrunken
[3]G indicates good, and P indicates poor, the total.

TABLE 3

Evaluation of Fluorine Series Sealing Agents

| | No. | Viscosity of Liquid Sealing Agent (Pa · s) | Application rate (mm/sec) | Evaluation of Size after curing[1] | Visible[2] | Total[3] |
|---|---|---|---|---|---|---|
| Example | 20 | 1000 | 8 | G | G | G |
| | 21 | 1100 | 8 | G | G | G |
| | 22 | 2000 | 8 | G | G | G |
| | 23 | 4000 | 8 | G | G | G |
| | 24 | 6500 | 6 | G | G | G |
| | 25 | 8000 | 6 | G | G | G |
| | 26 | 9000 | 5 | G | G | G |
| Comp. Example | 27 | 650 | 8 | P1 | N | P |
| | 28 | 970 | 8 | P1 | N | P |
| | 29 | 1100 | 8 | P2 | G | P |
| | 30 | 2000 | 6 | P2 | G | P |
| | 31 | 2000 | 4 | P1 | G | P |
| | 32 | 4000 | 4 | P2 | G | P |
| | 33 | 6500 | 3 | P2 | G | P |
| | 34 | 8000 | 3 | P2 | G | P |
| | 35 | 9500 | 1 | P2 | P | P |
| | 36 | 10000 | 1 | P2 | P | P |

[1]In Evaluation of size, G indicates good in which the width was 0.6 ± 0.1 mm, and the height was 0.5 ± 0.1 mm, P1 indicates poor level 1 in which the width exceeded 0.7 mm, and the height was lower than 0.4 mm, P2 indicates poor level 2 in which the width was lower than 0.5 mm, and the height was lower than 0.4 mm.
[2]G, N, and P described in the column, "Visible", indicates the results of the observation, where G indicates good, N indicates substantially good, and P indicates poor.
G: formed into substantially target size.
N: formed in the state of being dropped in the wide direction
P: formed in the state of being partially shrunken
[3]G indicates good, and P indicates poor, the total.

TABLE 4

Evaluation of Polyisobutylene Series Sealing Agents

| | No. | Viscosity of Liquid Sealing Agent (Pa · s) | Application rate (mm/sec) | Evaluation of Size after curing[1] | Visible[2] | Total[3] |
|---|---|---|---|---|---|---|
| Example | 37 | 1000 | 9 | G | G | G |
| | 38 | 1500 | 8 | G | G | G |

TABLE 4-continued

Evaluation of Polyisobutylene Series Sealing Agents

| | No. | Viscosity of Liquid Sealing Agent (Pa·s) | Application rate (mm/sec) | Evaluation of Size after curing[1] | Visible[2] | Total[3] |
|---|---|---|---|---|---|---|
| | 39 | 3500 | 8 | G | G | G |
| | 40 | 5500 | 8 | G | G | G |
| | 41 | 8500 | 6 | G | G | G |
| | 42 | 9000 | 4 | G | G | G |
| Comp. | 43 | 500 | 9 | P1 | N | P |
| Example | 44 | 700 | 8 | P1 | N | P |
| | 45 | 900 | 8 | P1 | N | P |
| | 46 | 10000 | 1 | P2 | G | P |
| | 47 | 12000 | 1 | P2 | G | P |

[1]In Evaluation of size, G indicates good in which the width was 0.6 ± 0.1 mm, and the height was 0.5 ± 0.1 mm, P1 indicates poor level 1 in which the width exceeded 0.7 mm, and the height was lower than 0.4 mm, P2 indicates poor level 2 in which the width was lower than 0.5 mm, and the height was lower than 0.4 mm.
[2]G, N, and P described in the column, "Visible", indicates the results of the observation, where G indicates good, N indicates substantially good, and P indicates poor.
G: formed into substantially target size.
N: formed in the state of being dropped in the wide direction
P: formed in the state of being partially shrunken
[3]G indicates good, and P indicates poor, the total.

As shown in Tables 2 to 4, in the comparative liquid sealing agents each having a viscosity deviating from the range of the present invention (Nos. 8–10, 27, 28, 35, 36, and 43–47, the cross-sectional size deviated from the target size of 0.6±0.1 mm, and were assumed to be poor.

In the comparative seals $q_1'$ (Comparative Example Nos. 11–16, and 29–34), each formed by the application of the liquid sealing agent having an appropriate viscosity but at the application rate deviating from the range of the present invention, the cross-sectional shape was out of the target size, but the visible evaluation was passed. Consequently, it can be deduced that the inventive seal $q_1$ having the desired shape and the target cross-sectional shape could be obtained if the application rate was set at the appropriate range.

In contrast, in the inventive seals $q_1$ (Nos. 1–7, 20–26, and 37–42), each formed by the application of the liquid sealing agent having an appropriate viscosity at the appropriate application rate, the cross-sectional shape after curing was within the target size, the visible evaluation was also passed and, thus, the total evaluation was passed. From these results, it has been proven that a satisfied seal could be obtained, if a liquid sealing agent $q_0$ having an appropriate viscosity was applied under the prescribed application conditions.

Example 2

(Dependency of Physical Durability of Inventive Seal $q_1$ upon Thermosetting Temperature)

Subsequently, physical deterioration acceleration tests for the various inventive seals $q_1$ produced under various conditions were carried out. Specifically, the inventive seal $q_1$ produced from the inventive liquid sealing agent $q_0$ in the same manner as in Example 1 at a given thermosetting temperature level for a given referential thermosetting time level was aged under the conditions where the heating temperature was 90° C., the heating time was 100 hours, and a constant load was applied so as to be 25% of the initial value of the compression of the liquid sealing agent $q_0$.

Thereafter, the permanent compression deformation (%) was determined. The permanent compression deformation (%) used herein was calculated as the proportion of the difference between the height $H_0$ of the inventive seal $q_1$ prior to the test and the height $H_1$ of the inventive seal $q_1$ after the test from the equation:

Deformation (%)=[{($H_0$–$H_1$)/$H_0$}×100].

Figure 4:
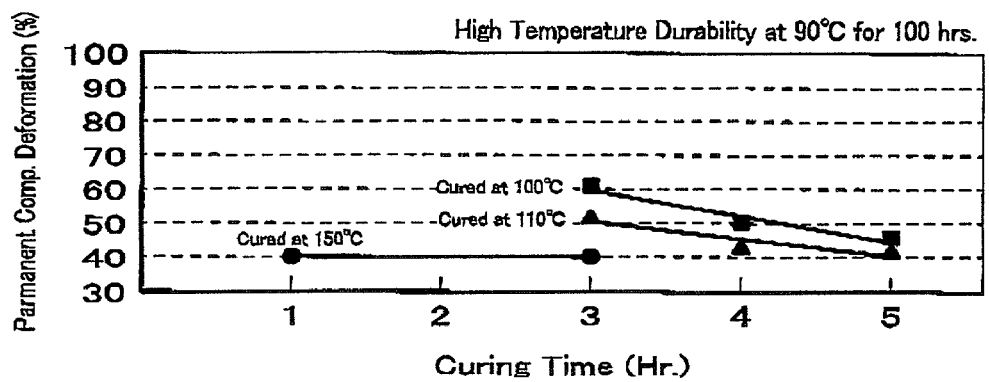
FIG. 4 is a graph showing one example of the results of thermal strain acceleration test of the seal $q_1$ according to the present invention produced at a various temperatures.

FIG. 4 shows one example of the results obtained with the various liquid sealing agents.

Specifically, the three thermosetting temperature levels, i.e., 100° C., 110° C., and 150° C. were used and two thermosetting time levels, i.e., 1 hour and 3 hours (in the case of the thermosetting temperature of 150° C.) or three time levels, i.e., 1 hour, 3 hours, and 5 hours (in the case of the thermosetting temperature of 100° C. or 110° C.) were used to produce the inventive seals $q_1$. The resulting inventive seals $q_1$ were tested for the physical deterioration acceleration test described above to determine the permanent compression deformation (%). The results are shown in FIG. 4. It can be understood from FIG. 4 that the permanent compression deformation (%) was changed depending upon the thermosetting temperature and the thermosetting period, and that higher the thermosetting temperature is or longer the thermosetting time is smaller the permanent compression deformation (%). This can be considered that higher the thermosetting temperature is or longer the thermosetting time, the reaction progress much more to accelerate the thermosetting the inventive seal $q_1$; thus, the cross-linking degree of the produced seals $q_1$ becomes larger, whereby the permanent compression deformation (%) from the physical deterioration acceleration test becomes small. Also, from FIG. 4 showing that the permanent compression deformation (%) in the case where the thermosetting temperature was 150° C. and the thermosetting time is 1 hour is similar to that in the case where the thermosetting temperature was 150° C. and the thermosetting time is 3 hours, it can be considered that the cross-linking density of the inventive seal $q_1$ is saturated when the thermosetting temperature was 150° C. and the thermosetting time is 1 hour. From the viewpoint of suppressing chemical deterioration of the inventive liquid sealing agent $q_0$, the thermosetting temperature is not higher than 150° C. Consequently, preference is given to use the thermosetting temperature not higher than 150° C.

It can be considered only from the results just mentioned and from the viewpoint of the chemical deterioration of the inventive liquid sealing agent $q_0$ that if the inventive liquid sealing agent $q_0$ is thermally cured at the thermosetting temperature of 150° C. over the thermosetting time of 1 hour, the inventive seal $q_1$ excelling in durability can be produced. However, from the viewpoint that thermal influence upon the electrolyte membrane M making up the fuel cell should be prevented as low as possible, the upper limit of the thermosetting temperature should be optimized.

Figure 5:
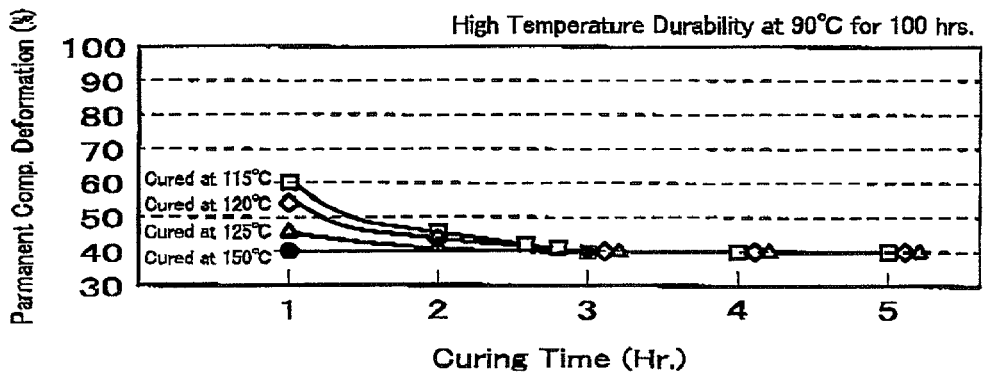
FIG. 5 is a graph showing another example of the results of thermal strain acceleration test of the seal $q_1$ according to the present invention produced at a various temperatures.

FIG. 5 shows the results of the physical deterioration test conducted similar to FIG. 4 setting the reference thermosetting temperatures in much more detail and using the inventive seal $q_1$. Similar to FIG. 4, it can be understood from FIG. 5 that the permanent compression deformation (%) was changed depending upon the thermosetting temperature and the thermosetting period, and that higher the thermosetting temperature is or longer the thermosetting time is smaller the permanent compression deformation (%).

We have separately examined the maintenance of the physical durability over a prolonged period of time of the inventive seal $q_1$ and the thermal influence upon the electrolyte membrane. As a result, it has been proven that if the thermosetting temperature is lower than 100° C., the reaction rate of the liquid sealing agent is decreased to remarkably lower the cross-linking density; thus, the inventive seal $q_1$, produced at such a thermosetting temperature is physically deteriorated with ease. Specifically, the thermosetting temperature is desired to be not lower than 100° C. Also, since the electrolyte membrane onto which the inventive seal $q_1$ is formed undergoes the damage over the tolerance level at a temperature higher than 130° C., the thermosetting temperature should be not higher than 130° C. It has been proven that sufficient permanent compression deformation (%) of the inventive seal $q_1$ is approximately 45 to 60%. From these results, the inventive seal $q_1$ is proven to be preferably formed by curing the inventive liquid sealing agent $q_1$ at a temperature of 115±5° C.

Example 3

(Suppression of Fracture of Separator Caused Due to Unevenness of Thickness of Diffusion Layer D)

In the fuel cell FC comprising the stack construction having the separators 1 and 2, the diffusion layer D, the membrane electrode assembly MEA, the electrolyte membrane M, etc. laminated, as shown in FIG. 1, when the inventive seal $q_1$ is intervened between the separators 1 and 2 and the membrane electrode assembly MEA, unevenness (hereinafter referred to as "uneven gap") will be caused between the separators 1 and 2 due to unevenness of the thickness of the diffusion layer D, generating the stresses at the inventive seals $q_1$, $q_1$, $q_1$, . . . formed between the separators 1 and 2. In order to relax these stresses, inventive seal $q_1$ should have a height of summing the gap plus the space for fastening inventive seal $q_1$. However, when the uneven gap is increased, the difference in the surface pressures of the inventive seals $q_1$, $q_1$, $q_1$, . . . provided on the respective separator contained in the stack structure ST becomes remarkable.

Figure 6:
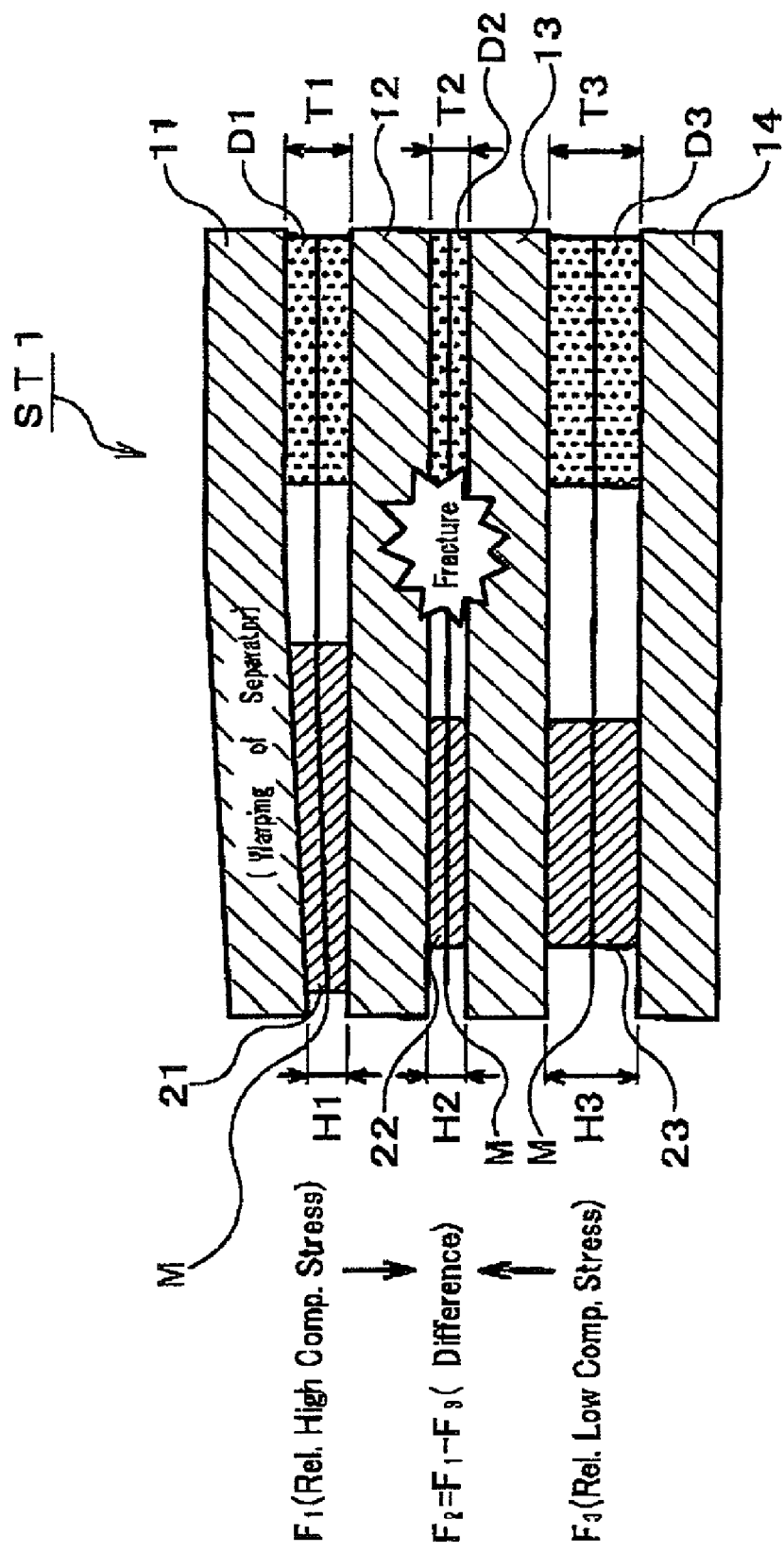
FIG. 6 is a drawing showing one example of a main portion of the stack construction shown in FIGS. 1 and 2.
Figure 7:
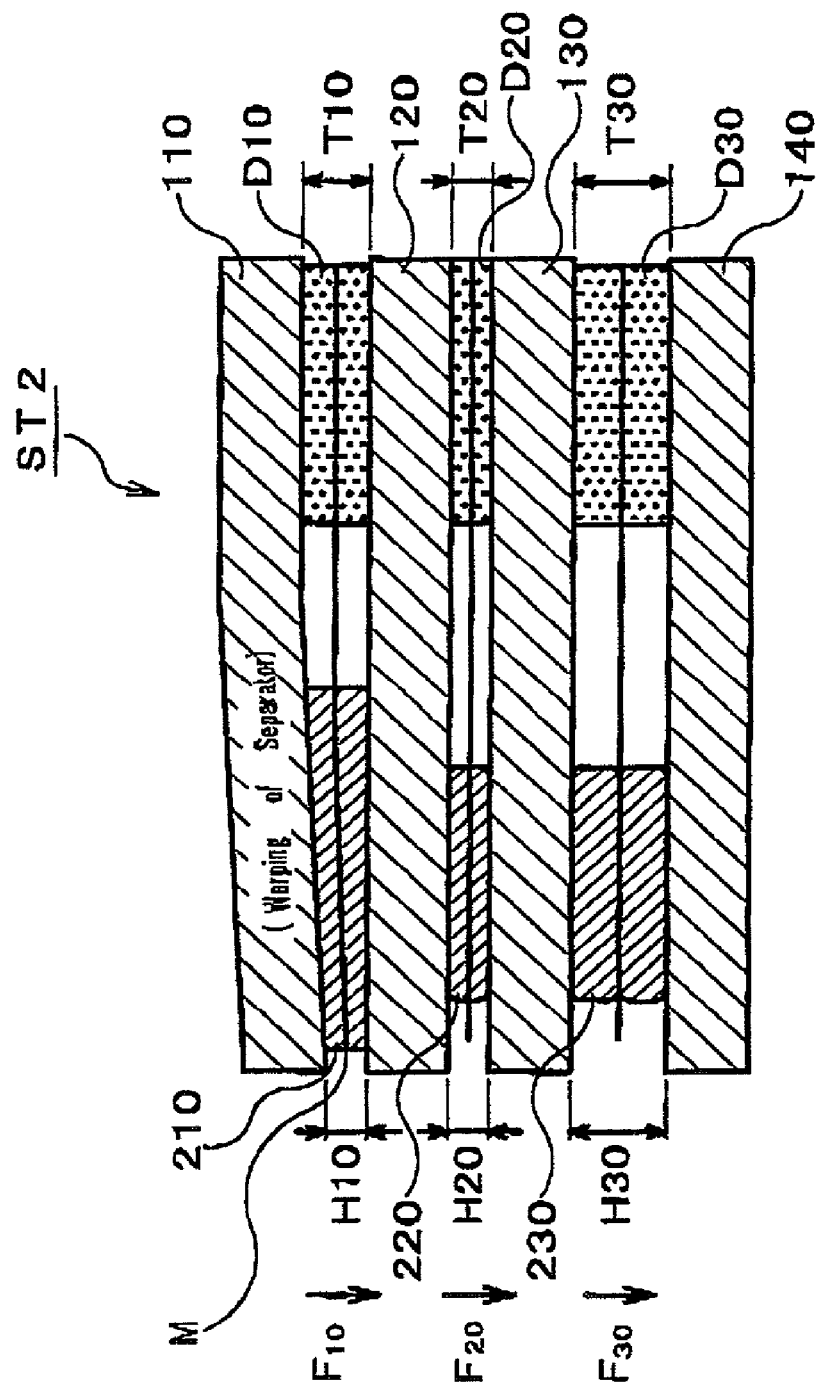
FIG. 7 is a drawing showing another example of a main portion of the stack construction shown in FIGS. 1 and 2.

The difference in the surface pressures of the inventive seals $q_1$, $q_1$, $q_1$, will generate the fracture stress on separators 1 and 2, etc., onto which the inventive seals $q_1$, $q_1$, $q_1$, . . . are formed. In the case of parts having a relatively small fracture stress by bending, such as a separator produced by caving sintered graphite or a separator formed by mixing carbon powders with 15–30% of resin (hereinafter referred to as "carbon separator"), there is a tendency to cause the fracture when the stack ST is fastened. FIGS. 6 and 7 each schematically shows the mechanism for fracture of the carbon separator by bending.

FIG. 6 shows the main portion of the stack structure ST of FIG. 1 and shows the stack structure ST comprising carbon separators 11, 12, 13, and 14, electrolyte membranes M, and M, diffusion layers D1, D2, and D3, and seals 21, 22, and 23. In FIG. 6, unevenness of the seals 21, 22, and 23 is brought about corresponding to the unevenness of the thickness T1, T2, and T3 of the diffusion layers D1, D2, and D3 (assuming that T3>T2>T1). There is an inherent internal stress in the carbon separators 11, 12, 13, and 14 due to the characteristics of the material, thermal histories, etc. In some cases, at least one of the carbon separators 11, 12, 13, and 14 will be warped due to the force relationship of the internal stress or the thermally amplified internal stress.

The situation is considered where the carbon separator 11 is warped as shown in FIG. 6. Due to the warping, first a relatively high compression stress $F_1$ is acted on the seal 21 in contact with the carbon separator 11. This compression stress $F_1$ is transmitted starting from the seal 21 to the carbon separator 12, the seal 22, the carbon separator 23, the seal 23, the carbon separator 14, and the seal 24 . . . one after another. At this time, a relatively low compression stress $F_3$ occurs on the seal 23 having a relatively large height. In such a situation, the difference in the stresses of $F_1$ and $F_3$ ($F_1-F_3=F_2$) is acted on the seal 22 placed between the seal 21 and the seal 23. If the difference in the stresses $F_2$ exceeds the fracture stress by bending of the carbon separator 12 or 13, the carbon separator 12 or 13 will be fractured. Particularly, in the case where solid seals having a constant width and a constant height are used, unevenness of the seals 21, 22, and 23 brought about due to the unevenness of the thickness T1, T2, and T3 of the diffusion layers D1, D2, and D3 (T3>T2>T1) cannot be relaxed and, thus, there is high possibility to fracture the separator according to this mechanism.

In contrast, when the inventive seals $q_1$ are used in the seals 21, 22, and 23, unevenness of the seals 21, 22, and 23 brought about due to the unevenness of the thickness T1, T2, and T3 of the diffusion layers D1, D2, and D3 (T3>T2>T1) can be sufficiently relaxed to suppress the fracture the separators 12 and 13. Specifically, the inventive liquid sealing agent $q_0$ is applied to prescribed portions of the carbon separators 11, 12, 13, and 14, it is thermally cured in the state where the carbon separators 11, 12, 13, and 14 are brought into contact with the diffusion layer D to form the inventive seals $q_1$, after which the carbon separators 11, 12, 13, and 14 are fastened. In this case, adequate spaces for fastening are generated on the seals 21, 22, and 23 whereby the heights of the seals 21, 22, and 23 can be followed-up with the thickness of the diffusion layers D1, D2, and D3 in an adequate manner. Consequently, even if a relatively high compression stress $F_1$ is acted on the seal 21 on account of warping the separator 11, and a relatively low compression stress $F_3$ is acted on the seal 23 to cause the difference in the stresses $F_2$ on the seal 22, the difference in the stresses $F_2$ can be suppressed small enough whereby the fracture of the carbon separator 12 or 13 can be sufficiently suppressed.

FIG. 7 shows a main portion of a stack structure ST2 having swelled graphite- or metal-based separators (hereinafter referred to as "metal separators") 110, 120, 130, and 140 instead of the carbon separators 11, 12, 13, and 14 shown in FIG. 6 and possessing solid seals 210, 220, and 230 with a constant width and a constant height.

FIG. 7 shows the situation where unevenness of the height H10, H20, and H30 (assuming H30>H10>H20) of the seals 210, 220, and 230 is brought about corresponding to the unevenness of the thickness T10, T20, and T30 of the diffusion layers D10, D20, and D30 (assuming that T30>T10>T20). Also, the situation is considered that metal separators 110, 120, 130, and 140 will be warped due to the force relationship of the internal counterforce or the thermally amplified internal counterforce. Even if a relatively high compression counterforce $F_{10}$ is acted on the seal 210 and a relatively low compression counterforce $F_{30}$ is acted on the seal 230 due to unevenness of the height of the seals 210, 220, and 230, resulting in the difference $F_{20}$ in the compression stress $F_{10}$ and the compression stress $F_{30}$ being acted on the seal 220, the metal separator 120 or 130 can be considered to be fractured only with difficulty because the metal separators 110, 120, and 130 have relatively high fracture stress by bending.

Subsequently, when the inventive seal $q_1$ is applied to the stack structure containing separators composed of a material having a relatively low fracture stress by bending and, thus being easy to be fracture, as well as a membrane electrode assembly MEA having relatively uneven diffusion layers, we have examined the guidance for designing the inventive seal $q_1$ which can exhibit the desired performances in a sufficient manner without fracturing the separator due to the fracture stress by bending and the degree of unevenness of the thickness of the membrane electrode assembly (difference in the maximum thickness and the minimum thickness (hereinafter simply referred to as "range").

Figure 8:
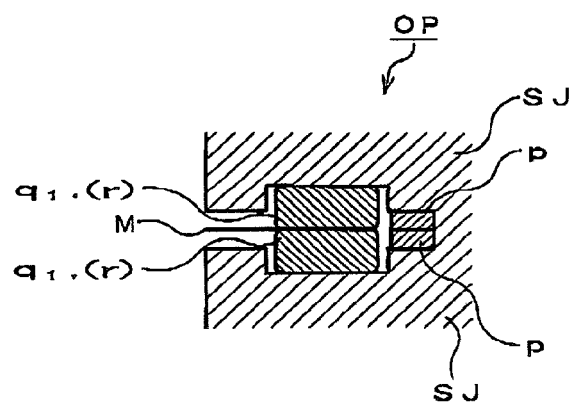
FIG. 8 is a drawing schematically showing the mechanism for bending fracture of the separator.

First, we have examined for the liquid sealing agent $q_0$ applicable to a stack structure having separators relatively easy to be fractured whose fracture stress by bending is not more than 80 MPa and membrane electrode assemblies MEB having a relatively high unevenness of the thickness range, ±0.075 mm. Using an apparatus OP for determining the surface pressure of seal as shown in FIG. 8, the surface pressure of the seal obtained by utilizing various liquid sealing agent applied to membrane electrode assemblies having uneven thickness was determined. For comparison, the surface pressure of the solid seal was also determined.

FIG. 8 shows the main portion of the apparatus OP for determining the surface pressure of seal. In the apparatus OP for determining the surface pressure of seal, an electrolyte membrane M possessing the inventive seal $q_1$ obtained by directly applying the inventive seal $q_1$ and thermally curing it or an electrolyte membrane M onto which the solid seal R having been formed into a solid with a constant size was adhered was clamped by a SUS-made jig SJ, and the surface pressure acted upon the inventive seal $q_1$ or the solid seal r was measured. In order to examine the influence of the unevenness of the thickness of the membrane electrode assemblies MEA contained in the stack structure, two spacers p each having a height corresponding to the sum of the height of the electrolyte membrane M having the inventive seal $q_1$ or the electrolyte membrane M having the solid seal r adhered thereon and the thickness of the diffusion layer were adhered to both surfaces of the electrolyte membrane M having the inventive seal $q_1$ or the electrolyte membrane M having the solid seal r adhered thereon whereby unevenness of the gap of the stack structure could be suitably set. After the electrolyte membrane M having the inventive seal $q_1$ or the electrolyte membrane M having the solid seal r adhered thereon was fit to the jig SJ made of SUS, the two spacers o were removed, and then a surface pressure sensor (not shown) was intervened between the electrolyte membrane M having the inventive seal $q_1$ or the electrolyte membrane M having the solid seal r adhered thereon and the inventive seal $q_1$ or the solid seal r. Subsequently, a given force was applied to the SUS-made jig SJ to compress the inventive seal $q_1$ or the solid seal r whereby the surface pressure to the compression amount relative to one side of the inventive seal $q_1$ or the solid seal r was determined. For comparison, the surface pressure F was acted so that the compression amount of one side of the diffusion layer became 0.05 mm. Table 5 shows the constructions of inventive seal $q_1$, the solid seal r and the membrane electrode assembly MEA.

TABLE 5

Constructions of Inventive Seal $q_1$ and Solid Seal r

|  | Inventive Seal $q_1$ | Solid Seal r |
|---|---|---|
| Inventive Liquid Sealing Agent $q_0$ | Liquid Thermosetting Fluorine Series Resin (Hardness of Cured | ← (Previously Cured into Constant Size) |

TABLE 5-continued

Constructions of Inventive Seal $q_1$ and Solid Seal r

|  | Inventive Seal $q_1$ | Solid Seal r |
|---|---|---|
| Seal Size | Substance: 50°) Width (mm): 3.46, 3.69 Height (mm): 1.2, 1.125 Applied Diameter (mm): 2.3 (Applied to seal groove as a center) | Width (mm): 3.5 Height (mm): 1.2 (Applied to seal groove as a center) |
| Size of Seal Groove[1] | Depth (mm): 0.5 Length (mm): 420 Width (mm): 5 |  |
| Size of Membrane Electrode Assembly MEA[2] | Thickness (mm): 1.45, 1.3 (Thickness of One Side of Diffusion Layer (mm): 0.700, 0.625) Plane Size (mm): 100 × 100 (Diffusion Layer: Carbon Paper) |  |

[1]Cross-section of Seal: 4.15–4.2 mm²
[2](Two spacers corresponding to the thickness of electrolyte membrane + the thickness of the diffusion layer)

As shown in Table 5, a liquid thermosetting sealing agent comprising a fluorine series resin was used as the inventive liquid sealing agent $q_0$. The hardness of the cured substance obtained by thermosetting the inventive liquid sealing agent $q_0$ was 50°. The inventive liquid sealing agent $q_0$ was applied at two width levels, i.e., 3.46 mm and 3.69 mm, and at two height levels, i.e., 1.2 mm and 1.2 mm and at an application diameter of 2.3 mm to a seal groove PT having 0.5 mm in depth, 420 mm in length, and 5 mm in width provided on the SUS-made jig, and then the system was directly laminated on the membrane electrode assembly MEA. After electrolyte membrane and the liquid sealing agent $q_0$ were come into closely contact with each other, a thermosetting treatment was conducted at 120° C. to form the inventive seal $q_1$, which was determined. The membrane electrode assembly MEA used had two thickness levels, i.e., 1.3 mm and 1.45 mm, and a plane size of 100 mm×100 mm. Onto both surfaces of the membrane electrode assembly MEA, carbon paper having two thickness levels, i.e., 0.62 mm and 0.700 mm was applied as the diffusion layer.

On the other hand, the solid seal r was formed by applying the inventive liquid sealing agent $q_0$ comprising the above-mentioned fluorine-series resin onto an aluminum base in a given size in advance, flowed by thermally treating to cure the inventive liquid sealing agent $q_0$, after which the cured substance was removed from the base. Subsequently, the solid seal r formed as described above was provided on the SUS-made jig SJ, and the membrane electrode assembly MEA was laminated thereon to conduct the measurement.

Figure 9:
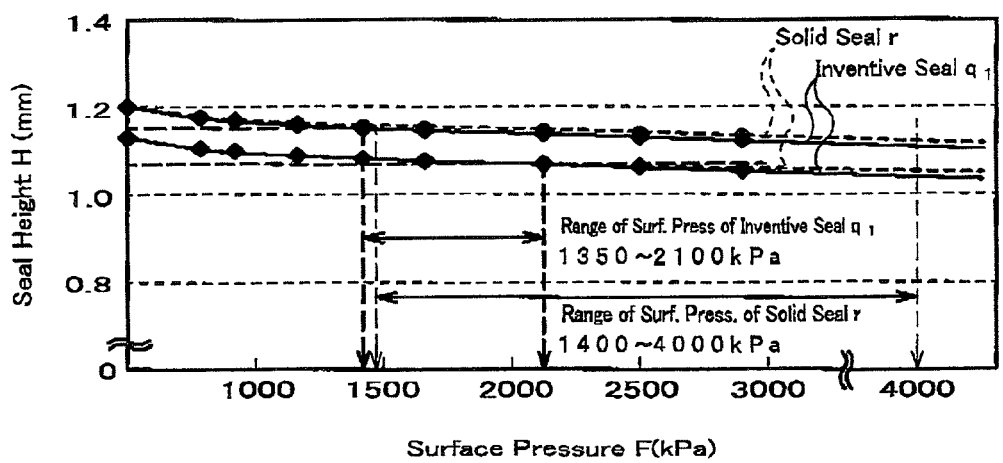
FIG. 9 is a graph showing the relationship between the surface pressure applied on the seal $q_1$ according to the present invention or the solid seal r to the total height of the seal when the surface pressure is applied.

FIG. 9 is a graph showing the relationship between the surface pressure F acted on the inventive seal $q_1$ or the solid seal r to the total height of the seal when various surface pressures F being applied. Specifically, in FIG. 9, with regard to the inventive seal $q_1$ formed from the inventive liquid sealing agent $q_0$, and to the solid seal r, assuming that the gap range of the separators become 0.075 mm, a diffusion layer having the maximum thickness of 1.20 mm (hereinafter simply referred to as "maximum thickness") and a diffusion layer having the minimum thickness of 1.125 mm (hereinafter simply referred to as "minimum thickness") were used, the maximum thickness and the minimum thickness were taken as the initial value of the total height of the seal, and a surface pressure F (kPa) was continuously acted to determine the surface pressure $F_0$ (kPa) via the SUS-made jig at the time where the compression amount of one side of the diffusion layer D became 0.05 mm.

Referring to FIG. 9, in both cases of the inventive seal $q_1$ and the solid seal r, as the surface pressure was increased from the initial value of the maximum value, 1.20 mm or the minimum value, 1.125 mm, the total height H was gradually decreased. In the inventive seal $q_1$, at the surface pressure of 1350 kPa, the total seal height H became 1.15 mm, i.e., the compression amount was 1.2 mm−1.15 mm=0.05 mm in the case where the diffusion layer was set at the maximum thickness. Also, in the case where the diffusion layer was set at the minimum thickness, at the surface pressure of 2100 kPa, the total seal height H became 1.075 mm, i.e., the compression amount was 1.125 mm −1.075 mm=0.05 mm.

It can be understood from these results that in the inventive seal $q_1$ formed by applying the inventive sealing agent $q_0$ onto the electrolyte membrane M contained in the membrane electrode assembly MEA and laminating the separator thereon, the range of the difference in the surface pressures at the compression amount of 0.05 mm caused due to unevenness of the thickness of the membrane electrode assembly MEA is not less than 1350 kPa and not more than 2100 kPa.

On the other hand, in the solid seal r, when measured by setting the thickness of the diffusion layer D to the maximum thickness, at the pressure F of 1400 kPa, the total seal height H became 1.15 mm, i.e., the compression amount became 0.05 mm. When measured by setting the thickness of the diffusion layer D to the minimum thickness, at the pressure F of 4000 kPa, the total seal height H became 1.075 mm, i.e., the compression amount became 0.05 mm. The results illustrate that in the solid seal r, the range of the difference in the surface pressures at the compression amount of 0.05 mm caused due to unevenness of the thickness of the membrane electrode assembly MEA is not less than 1400 kPa and not more than 4000 kPa.

It can be summarized that in comparison with the solid seal r, produced by previously thermosetting the inventive liquid sealing agent q0 to be cured into a given size, the inventive seal $q_1$ has a smaller range of the surface pressure corresponding to the unevenness of the thickness of the membrane electrode assembly MEA. Accordingly, it can be understood that the inventive seal $q_1$ can be deformed flowing-up the unevenness of the thickness of the diffusion layer D, and, thus, uneven thickness of the membrane electrode assembly MEA in a sufficient manner and thus, the unevenness can be sufficiently relaxed.

Example 4

(Demonstrative Test for Suppression of Fracture Stress by Bending of Separation by Application of Inventive Seal)

Figure 10:
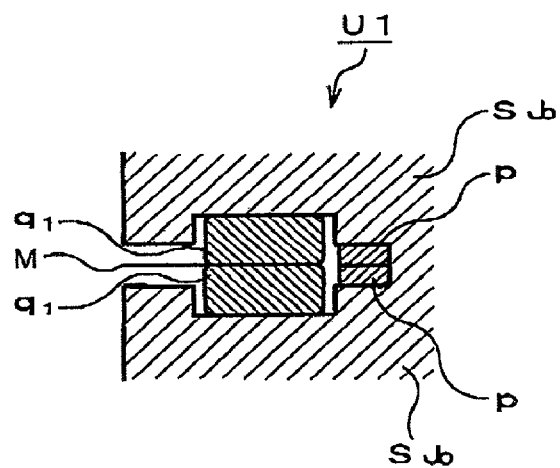
FIG. 10 is a schematic view of an apparatus for measuring fracture stress of a separator.

Next, an apparatus U1 for measuring the maximum fracture stress by bending of a separator as shown in FIG. 10 was used to conduct bending fracture tests of separators each having a fracture stress by bending and having the inventive seal $q_1$ or the solid seal r applied thereon.

Figure 11:
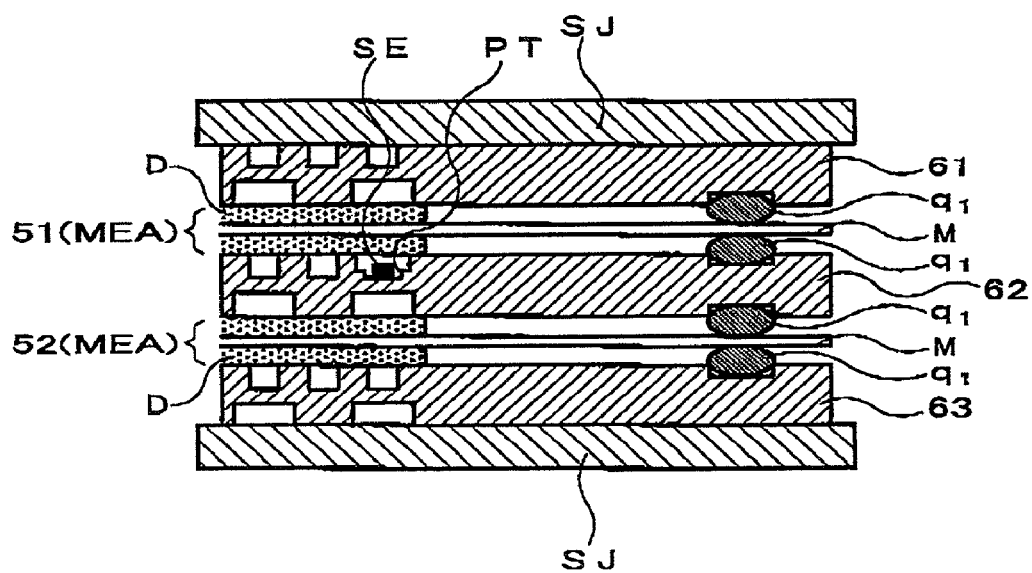
FIG. 11 is a drawing showing the apparatus for measuring fracture stress of a separator embedded into one example of the stack structure of the fuel cell.

As shown in FIG. 11, The apparatus U1 for measuring the maximum fracture stress by bending of a separator is composed of the SUS-made jig SJ which clamps a stack structure comprising a lamination of membrane electrode assemblies MEA 51 and 52, a diffusion later D, and separators 61, 62, and 62, and the inventive seals q1 interposed between the membrane electrode MEA 51 and the separators 61, and 62, and between the membrane electrode MEA 52 and the separators 62, and 63, at a give stress and a deformation sensor Se having been provided on a groove PT provided at a given portion of the separator 62 so as to determine the deformation amount at the groove PT (see FIG. 11).

Figure 12:
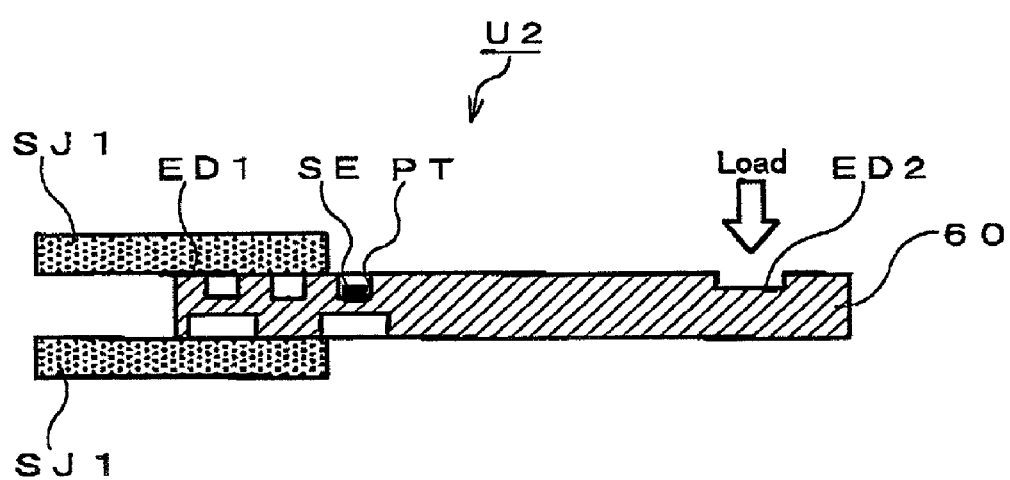
FIG. 12 is a drawing showing the configuration of the apparatus for measuring fracture stress of a separator.

On the other hand, the counterforce of the separators 61, 62 and 63 against the fracture was determined by an apparatus U2 for measuring fracture stress of a separator as shown in FIG. 12. In the apparatus U2 having a deformation sensor SE provided on the groove PT provided at a given portion of the separator 60 as shown in FIG. 12, one end ED1 of the separator 60 was fixed through an SUS-made Jig SJ for the fixation, and load was applied to the other end ED2 of the separator 60 to identify the relation between the deformation amount determined by the deformation sensor SE and the load applied, i.e., "stress-deformation curve".

Figure 13:
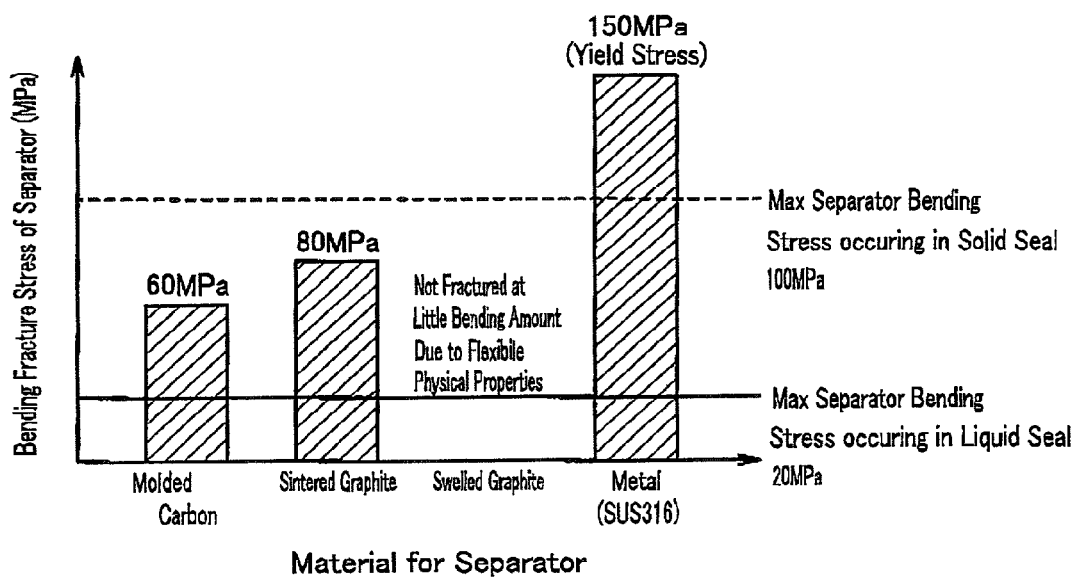
FIG. 13 is a graph showing the results of bending fracture test for separators each having various fracture stresses with the seal $q_1$ according to the present invention or the solid seal r applied.

The results of the bending fracture test of the separator having a wide variety of fracture stress by bending and having the inventive seal $q_1$ or the solid seal r applied are shown in FIG. 13. In FIG. 13, the horizontal axis indicates the type of the separator and the vertical axis indicates the fracture stress of the separator by bending (MPa). Also in FIG. 13, the real line stands for the maximum fracture stress by bending of the separator generated at the inventive seal $q_1$ in the range of the uneven thickness (1.125 mm −1.20 mm) of the membrane electrode assembly MEA measured by the apparatus U1, and the broken line stands for that in the case of the solid seal r. In the range of the uneven thickness of the membrane electrode assembly MEA, the maximum fracture stress by bending of the separator generated at the inventive seal $q_1$ was found to be 20 MPa, while that of the liquid seal r was found to be 100 MPa.

As shown in FIG. 13, comparing the fracture stresses by bending possessed by various separators, the maximum fracture stress by bending of the separator generated at the inventive seal $q_1$, and the maximum fracture stress by bending of the separator generated at the solid seal r, with regard to the separators made of mold carbon and made of sintered carbon having the fracture stress by bending of 60 MPa and 80 MPa, since the fracture stress is lower than the maximum fracture stress by bending of the separator generated at the solid seal r, which is 100 MPa, there is of a high possibility to fracture such separators made of mold carbon and sintered carbon by the application of the solid seal r.

On the other hand, since the maximum fracture stress by bending of the separator generated at the inventive seal $q_1$ which is 20 MPa, is lower than all of the fracture stresses by bending possessed by the separators, the application of the inventive seal $q_1$ can be assumed to suppress the fraction of these separators. It can be proven from these results that in the combination of the separators each having the fracture stress by bending possessed by the separators not more than 80 MPa, the maximum uneven thickness of the membrane electrode assemblies of ±0.075 mm, the inventive seal $q_1$ can be applied to sufficiently suppress the fracture of the stack structure ST.

Example 5

Figure 14:
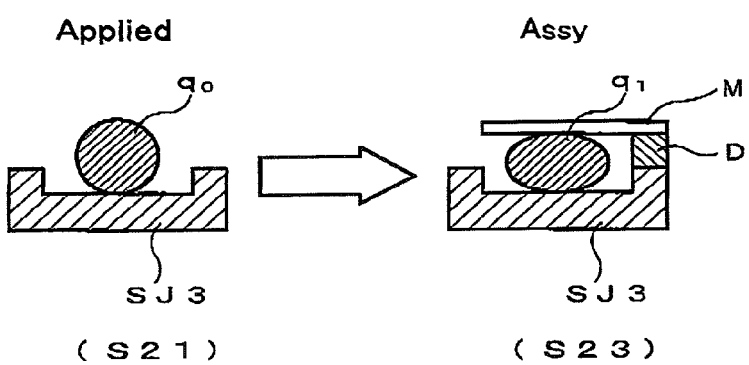
FIG. 14 is a schematic drawing showing the configuration of an apparatus used in the leakage test of the seal $q_1$ according to the present invention.

Next, setting the unit volume of the inventive liquid sealing agent $q_0$ used for the formation of the inventive seal $q_1$ per unit length (1 mm) at from 0.07 to 7.10 mm$^3$, and setting the compression rate applied to the inventive seal $q_1$ at 2.0 to 16.0%, a durability test at a high temperature was conducted at 90° C. over a period of 100 hours. In this test, the heating temperature was 90° C., the atmospheric temperature was −40° C., and a He gas at a pressure of 200 kPa was used to determine gas leakage as shown in FIG. 14. Specifically, as shown in FIG. 14, the inventive liquid sealing agent $q_0$ was applied to a jig SJ3 made of SUS316 having a concave cross-sectional shape, and then heated at 120° C. for 3 hours to cure the inventive liquid sealing agent $q_0$. A diffusion layer D was interposed between the jig SJ3 and an electrolyte membrane M, and the space surrounded by the electrolyte membrane M, the diffusion layer D, the jig SJ3, and the inventive seal $s_1$ was filled with a He gas to conduct a leak test. The results are shown in FIG. 15.

Figure 15:
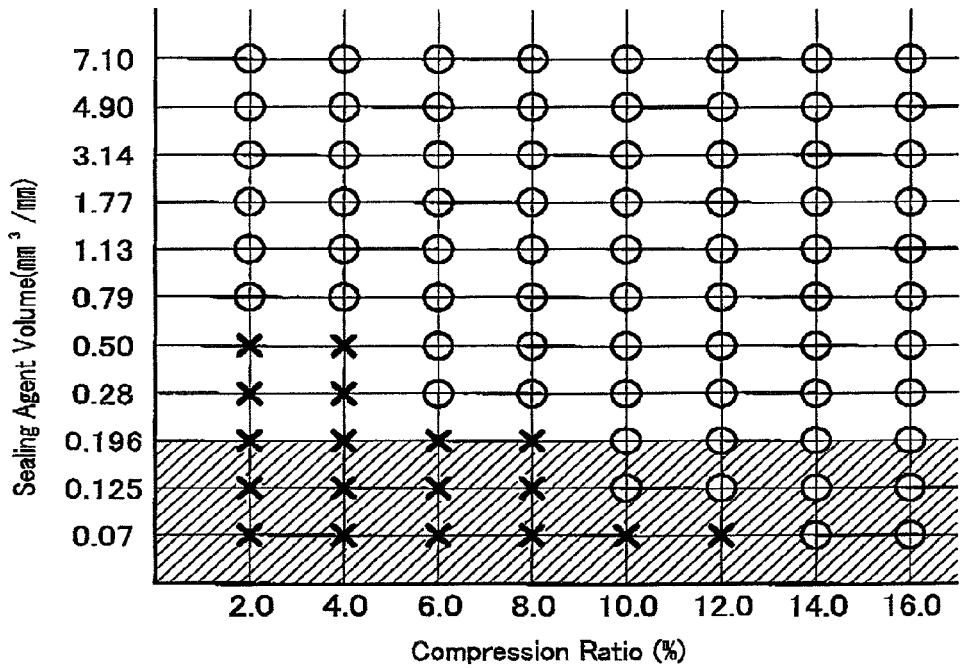
FIG. 15 is a graph showing the results of the leakage test of the seal $q_1$ according to the present invention.

In FIG. 15, the horizontal axis indicates the compression rate (%) acted upon the inventive seal $s_1$, and the vertical axis indicates the volume of the inventive seal $s_1$ (mm³/mm). Also, in this figure, the symbol "circle" means "good" in which when the leakage test was conducted at the atmospheric temperature of −40° C. and at the pressure of 200 kPa after the durability test at a high temperature conducted at the heating temperature of 90° C. for 100 hours, the leakage amount was 0 cc/min; the symbol "cross" means "poor" in which the results of the leakage test just mentioned was not less than 0.5 cc/min. From the results shown in FIG. 15, it can be understood that sufficient sealing property can be maintained even after the durability test at a high temperature to obtain a desired sufficient durability, if the volume of the inventive sealing agent r0 is 0.28 mm³/mm and the compression rate is not less than 6%.

Example 6

(Thermal Strain Acceleration Test)

An inventive liquid sealing agent $q_0$ comprising a thermosetting fluorine series resin as a main ingredient was used to produce eight inventive seals $q_1$, having hardness after thermally cured from 21 to 93°. These seals are tested for thermal strain acceleration. The hardness characteristics of these seals are shown in Table 6.

Figure 16:
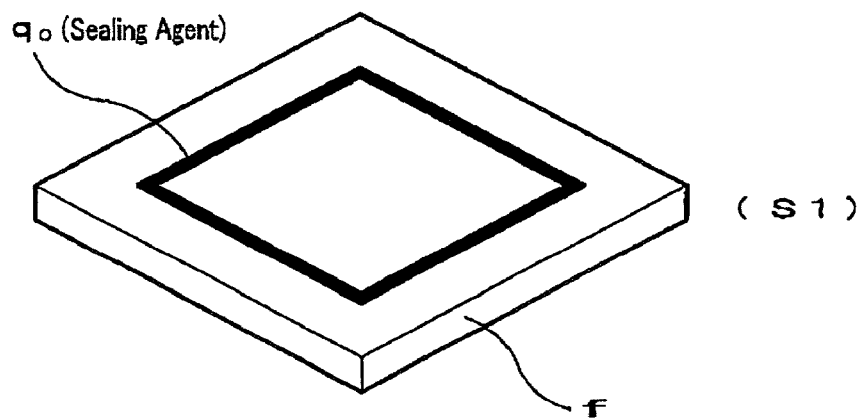
FIG. 16 is a drawing schematically showing the configuration of an apparatus for thermal strain acceleration test and its process.
Figure 16:
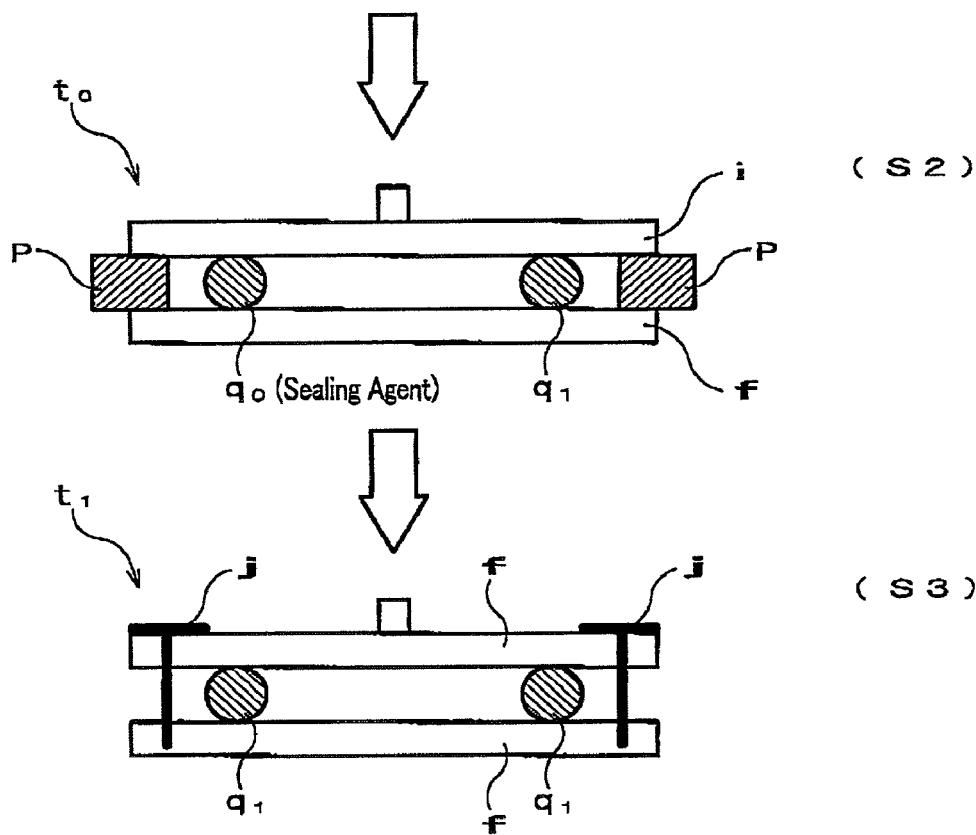

The thermal acceleration stain test was carried out as follows: Onto a jig f made of an SUS 316 plate as shown in FIG. 16, each of the eight inventive seals $q_1$, having hardness after thermally cured from 21 to 93° was directly applied so that the cross-sectional application diameter was 0.6 mm (S1). After a spacer p having the cross-sectional shape of 0.4 mm×0.4 mm square was placed on the outer circumference of the jig f, an SUS 316-made plate i having no inventive liquid sealing agent $q_0$ applied thereon was placed on the jig f, and the plate i, the inventive, the liquid sealing agent $q_0$, and spacer p were brought into closely contact with each other to produce a test sample $t_0$ (S2). Subsequently, the test sample $t_0$ was thermally treated at 50° C. for 2 hours, and the test sample $t_0$ was fastened by a bolt j so that the amount of the height of the inventive seal $q_1$ was 25% to produce a test sample $t_1$ (S3). Thereafter, the test sample $t_1$ was inserted into an oven at the temperature of 90° C. to be heated over a period of a given time. The test sample $t_1$ was taken from the oven at a prescribed interval, the test sample $t_1$ was cooled to the room temperature, and the space surrounded by the electrolyte membrane M, the diffusion layer D, the jig SJ3, and the inventive seal $s_1$ was filled with a He gas to conduct a leak test at the application pressure of 200 kPa. The situations of the deterioration were quantitatively estimated from the determined values of the permanent compression deformation (%), which was a proportion of the compression amount relative to the original size. The results are shown in Table 7.

TABLE 6

| No. | Hardness |
| --- | --- |
| 0(a) | 21–29 |
| (b) | 30–38 |
| (c) | 40–50 |
| (d) | 50–55 |
| (e) | 60–70 |
| (f) | 70–76 |
| (g) | 80–85 |
| (h) | 85–93 |

The determination of the hardness was carried out using a durometer at shore A defined in JIS K 6253.

TABLE 7

Permanent Compression Deformation (%)/Gas Leakage Amount

| No. | Hardness | 100 hr | 200 hr | 300 hr | 400 hr | 500 hr | 600 hr | 700 hr |
| --- | --- | --- | --- | --- | --- | --- | --- | --- |
| (a) | 21–29 | 30 (0) | 39 (0) | 44 (0) | 52 (0) | 57 (0) | 70 (0) | 85 (0) |
| (b) | 30–38 | 23 (0) | 27 (0) | 32 (0) | 38 (0) | 42 (0) | 50 (0) | 62 (0) |
| (c) | 40–50 | 17 (0) | 20 (0) | 25 (0) | 30 (0) | 37 (0) | 46 (0) | 55 (0) |
| (d) | 50–55 | 13 (0) | 16 (0) | 21 (0) | 24 (0) | 27 (0) | 33 (0) | 48 (0) |
| (e) | 60–70 | 12 (0) | 15 (0) | 17 (0) | 20 (0) | 23 (0) | 30 (0) | 42 (0) |
| (f) | 70–76 | 10 (0) | 12 (0) | 15 (0) | 17 (0) | 19 (0) | 24 (0) | 33 (0) |
| (g) | 80–85 | 7 (0) | 8 (0) | 11 (0) | 13 (0) | 16 (0) | 22 (0) | 30 (0) |
| (h) | 85–93 | 5 (0) | 7 (0) | 10 (0) | 12 (0) | 13 (0) | 16 (0) | 20 (0) |

The amount in the parentheses indicates a gas leakage amount (cc/min).

Table 7 shows the permanent thermal deformation (%) and the amount of gas leakage (cc/min) when the time which as for the test sample $t_1$ having the inventive seal $q_1$ produced from the various inventive liquid sealing agents $q_0$ was heated at 90° C. for the period of from 100 to 1000 hours, the sample $T_1$ was cooled to the room temperature at a given interval, and the sample $T_1$ was tested for the leakage test using He gas at a pressure of 200 kPa.

As is understood from the results shown in Table 7, in each test sample, the permanent compression deformation (%) was increased as the heating time was increased. Particularly, in the case of the seal having a hardness of 21–29, the permanent compression deformation (%) was sharply increased as the heating time was increased. In such a sample heated at 90° C. for the accumulated period of 1000 hours, the permanent compression deformation (%) reached as high as 85(%), and the gas leakage of 2 cc/min was brought about. The samples other than this could not find any gas leakage in this heating test.

Example 7

Figure 17:
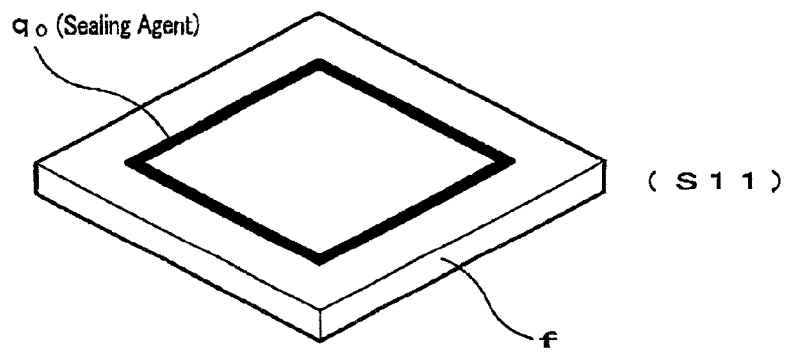
FIG. 17 is a drawing schematically showing the configuration of an apparatus for measuring the relationship between the surface pressure and the thickness relating to the seal $q_1$ according to the present invention and its process.
Figure 17:
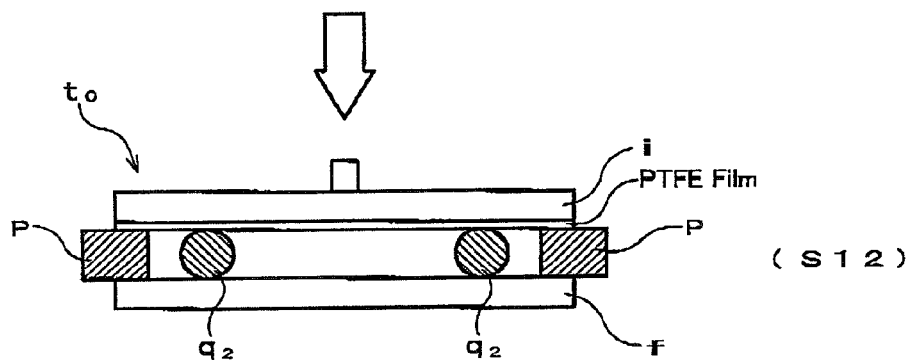
Figure 17:
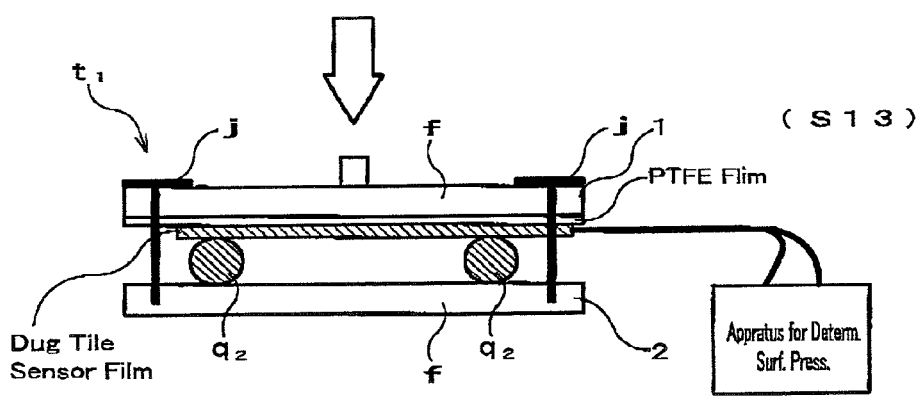

Next, each of eight inventive or comparative liquid sealing agents (a) to (h) each comprising a thermosetting fluorine series resin as a main ingredient (in this example, the inventive sealing agents and the comparative liquid sealing agent are totally referred to as sealing agent $q_0$ for convenience) was directly applied onto a SUS-made jig f as shown in FIG. 17 so that the cross-sectional diameter was 0.6 mm (S11). After a spacer p having a size of 0.4 mm ×0.4 mm was placed on the outer circumference of the jig f, a plate i made of SUS 316 in which no sealing agent $q_0$ was applied but a polytetrafluoroethylene was coated on the surface thereof to improve the releasability was placed on the jig f, and the plate i, the jig f, and the sealing agent $q_0$ were brought into contact with each other to produce a test sample $t_0$ (S12). Subsequently, the test sample $t_0$ was thermally treated at 150° C. for 2 hour to thermally cure the sealing agent $q_0$. This formed inventive seals and comparative seals (the inventive seals and the comparative seals in this Example totally referred to as "seals $q_2$"). The seal $q_2$ was then released from the plate i, and then the spacer p was removed.

Next, a tag tile sensor film for measuring a surface pressure was inserted between the outer surface of the seal $q_2$ and the surface of the plate i made of SUS 316 in which a polytetrafluoroethylene was coated on the surface thereof, then fastened by a bolt, and then compressed at a given pressure (S13). The seals $q_2$ produced from the sealing agents $q_o$ of (a) to (h) shown in Table 6 were measured for the relation between the surface pressure and the thickness. The results are given in FIG. 18. This example evaluated the dependency of the seal $q_2$ upon the hardness when the height H of the seal was changed by the surface pressure acted on the seal $q_2$, of (a) to (h).

Figure 18:
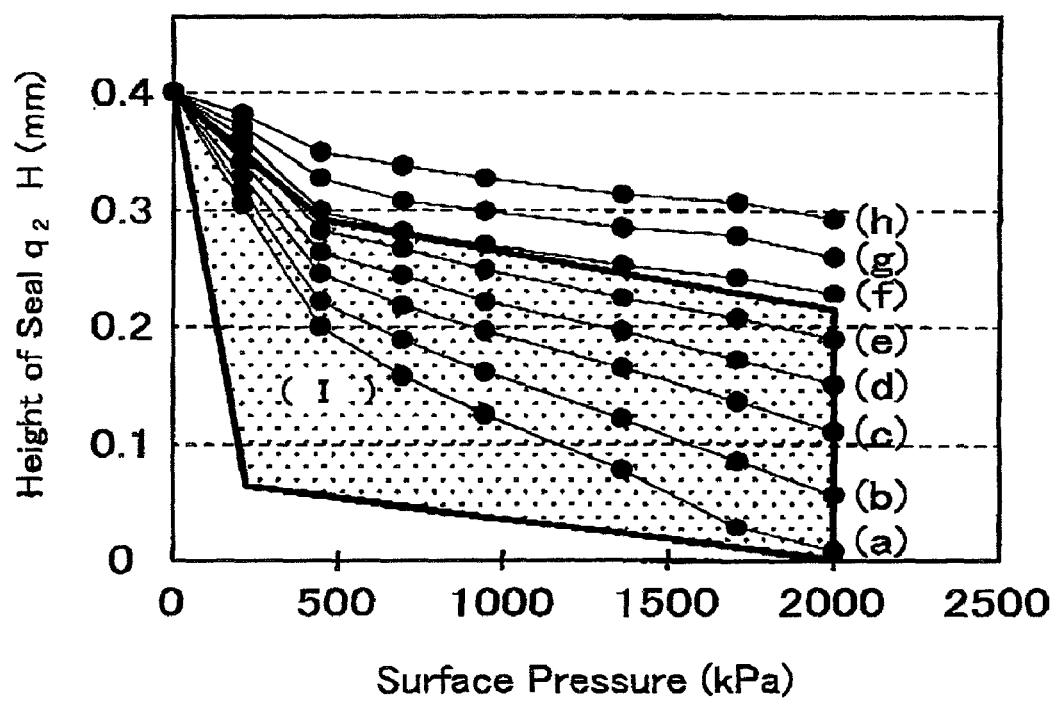
FIG. 18 is a graph showing the results of measuring the relationship between the surface pressure and the thickness relating to the seal $q_1$ according to the present invention.

FIG. 18 illustrates that the thickness of any of the seals $q_2$, of (a) to (h) was decreased as the surface pressure was increased. It can be understood that higher the hardness was the rate of decreasing the height H of the seal $q_2$ relative the surface pressure smaller. In FIG. 18, the shaded area (I) indicates the area of the compression load characteristics of carbon paper or carbon cloth representative for the material of the diffusion layer contained in the stack structure of the fuel cell, and there are measured points in this area (I). The seals $q_2$ of (a), (b), (c), (d), and (e) were found to be in relatively consistency with the compression load characteristics of the diffusion layer. It can be said from these results that in the seal $q_2$ having a higher hardness, the proportion of increasing the surface pressure relative to the compression amount becomes higher.

In FIG. 19, the comparison of the compression load characteristics of carbon paper or carbon cloth representative for the material of the diffusion layer contained in the stack structure of the fuel cell as shown in the shaded area (I) with the compression load characteristics of the seals $q_2$ of (a) to (h) can be considered that depending on the relation of the degrees of the surface pressure acted on the diffusion layer and the surface pressure acted on the seal $q_2$, the following phenomenon will occur.

Figure 19A:
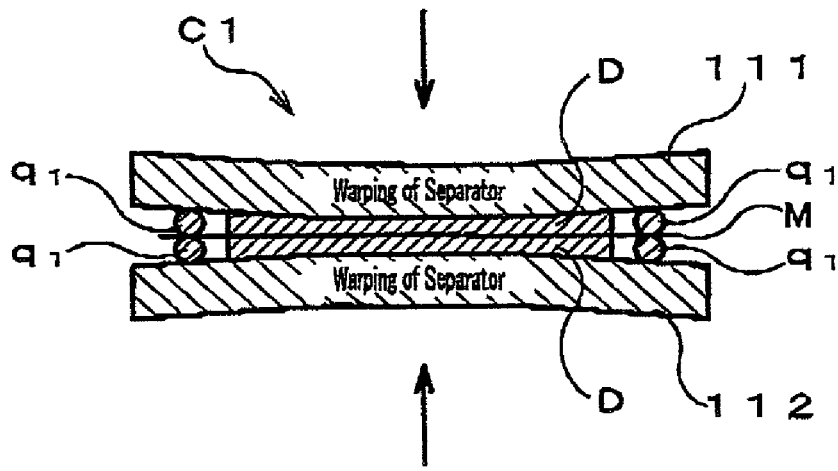
FIGS. 19A and 19B are schematic drawings showing the state of the deformation of the separator according to the degree of surface pressure α of the seal $q_1$ according to the present invention and the surface pressure β of the diffusion layer.
Figure 19B:
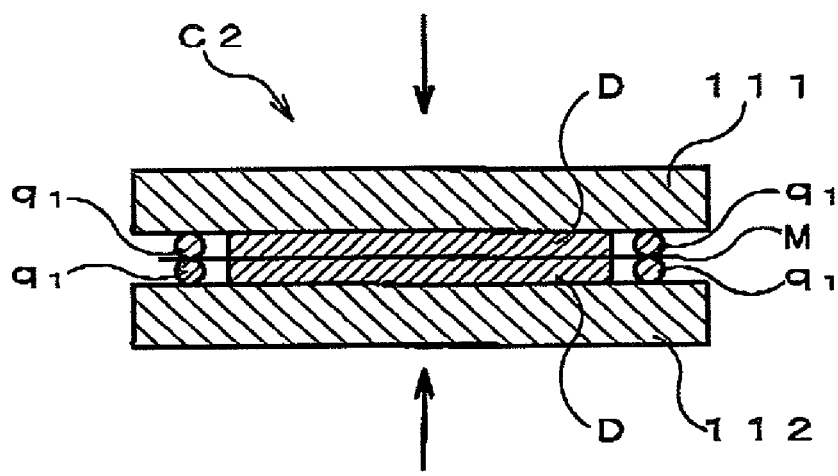

FIG. 19A and FIG. 19B each schematically shows a main portion of the cells C1 or C2 composed of an electrolyte membrane M, a diffusion layer D, separators 111 and 112, and the inventive seal $q_1$. FIG. 19A shows that the surface pressure a acted on the inventive seal $q_1$ is larger than the surface pressure β acted on the diffusion layer D as shown in the arrow, when the a given load is applied to the separator. FIG. 19B shows that the surface pressure α acted on the inventive seal $q_1$ is equal to or smaller than the surface pressure β acted on the diffusion layer D as shown in the arrow, when the a given load is applied to the separator.

As shown in FIG. 19A, when the surface pressure α acted on the inventive seal $q_1$ is larger than the surface pressure β acted on the diffusion layer D, since the surface pressure is predominantly acted at the portion where an area bringing the separators 111 and 112 into contact with the inventive seal $q_1$ is relatively narrow, the pressure at the contact portion becomes relatively large, which will pick up the ends of the separators 111 and 112, causing the warp in which the center portion is relatively curved toward inner direction. If the separators 111 and 112 are warped, they are easily fractured due to the unevenness of the thickness of the membrane electrode assemblies MEA contained in the stack structure. Consequently, in this case as shown in FIG. 19A, there is a large possibility to causing the fracture of the separators 111 and 112.

On the other hand, as shown in FIG. 19B, when the surface pressure α acted on the inventive seal $q_1$ is equal to or smaller than the surface pressure β acted on the diffusion layer D as shown in the arrow, since the surface pressure is predominantly acted at the portion where an area bringing the separators 111 and 112 into contact with the inventive seal $q_1$ is relatively wide, the pressure at the contact portion becomes relatively small. In this case, it becomes difficult to warp the separators 111 and 112. Consequently, in this case as shown in FIG. 19B, there is little possibility to causing the fracture of the separators 111 and 112.

Specifically, it is desirable that the surface pressure α of the inventive seal $q_1$ is equal to or smaller than the surface pressure β of the diffusion layer D.

Consequently, in order to avoid the possibility of fracturing the separator by suppressing the thermal stain of the seal contained in the stack structure of the fuel cell and by preventing the warping of the separator contained in the stack structure, the hardness of the inventive seal $r_1$ preferably possesses hardness from 30 to 70° measured according to a hardness test using a durometer at shore A defined in JIS K 6253.

What is claimed is:

1. A polymer electrolyte fuel cell, comprising:
   a seal formed from a liquid thermosetting sealing agent, and
   a lamination of separators and a membrane electrode assembly tightly sealed with the seal;
   a gap formed between each separator and the membrane electrode assembly,
   wherein said seal is formed by applying the liquid thermosetting sealing agent into the gap,
   thermally curing the liquid thermosetting sealing agent at a temperature in a range of from 100 to 130° C. over a period of from 1 to 5 hours,
   the liquid thermosetting sealing agent is based on a silicone series elastomer or isobutylene series elastomer, and
   a viscosity of the liquid thermosetting sealing agent at application is from 1,000 to 9,000 Pa.s,
   wherein upon curing, the seal has a permanent deformation of 60% or less when thermally aged at 90° C. for 100 hours to retain the gap upon sealing.

2. The polymer electrolyte membrane fuel cell as claimed in claim 1, wherein a controlled temperature range for curing the liquid thermosetting sealing agent is a predetermined temperature of ±5° C.

3. The polymer electrolyte membrane fuel cell as claimed in claim 1, wherein a controlled temperature range for curing the liquid thermosetting sealing agent is 120° C.±5° C.

4. The polymer electrolyte membrane fuel cell as claimed in claim 1, wherein a hardness of the liquid thermosetting sealing agent after curing measured according to a hardness test using a durometer at shore A defined in JIS K 6253 is in a range of 30 to 70° C.

5. A single cell making up a polymer electrolyte membrane fuel cell as claimed in claim 1, wherein in the lamination, the gap between each separator and the membrane electrode assembly is tightly sealed with said seal, said seal formed by thermally curing the liquid thermosetting sealing agent in the range of from 100 to 130° C. over a period of from 1 to 5 hours as claimed in any one of claims 1 to 4.

6. A process for producing a polymer electrode fuel cell, comprising: a seal formed from a liquid thermosetting sealing agent, and a lamination of separators and a membrane electrode assembly tightly sealed with the seal, the seal formed by applying the liquid thermosetting agent into a gap formed between each separator and the membrane electrode assembly, the process comprising the following steps:

a step for applying the liquid thermosetting sealing agent into the gap formed between each separator and the membrane electrode assembly at an application rate preset depending upon the viscosity of the liquid thermosetting sealing agent, and width and height of a resulting seal;

thermally curing the liquid thermosetting sealing agent at a temperature in the range from 100 to 130° C. over a period of from 1 to 5 hours;

the liquid thermosetting sealing agent being based on a silicone series elastomer or isobutylene series elastomer, and the viscosity of said liquid thermosetting sealing agent at application is from 1,000 to 9,000 Pa·s; and said liquid thermosetting sealing agent is based on a silicone series elastomer or isobutylene series elastomer, and the viscosity of said liquid thermosetting sealing agent during application is from 1,000 to 9,000 Pa·s, wherein upon curing, the seal has a permanent deformation of 60% or less when thermally aged at 90° C. for 100 hours to retain the gap upon sealing.

* * * * *